US011974099B2

(12) United States Patent
Higgins et al.

(10) Patent No.: US 11,974,099 B2
(45) Date of Patent: Apr. 30, 2024

(54) CONNECTOR TIP WITH BRISTLES FOR HEARING INSTRUMENTS

(71) Applicant: Starkey Laboratories, Inc., Eden Prairie, MN (US)

(72) Inventors: Sidney A. Higgins, Maple Grove, MN (US); David Tourtelotte, Eden Prairie, MN (US); Kyle Olson, St. Louis Park, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 176 days.

(21) Appl. No.: 17/589,303

(22) Filed: Jan. 31, 2022

(65) Prior Publication Data

US 2022/0159390 A1 May 19, 2022

Related U.S. Application Data

(63) Continuation of application No. PCT/US2020/045444, filed on Aug. 7, 2020.

(Continued)

(51) Int. Cl.
*H04R 25/00* (2006.01)
*H04R 31/00* (2006.01)

(52) U.S. Cl.
CPC ........... *H04R 25/60* (2013.01); *H04R 25/556* (2013.01); *H04R 31/006* (2013.01); *H04R 2225/31* (2013.01); *H04R 2460/17* (2013.01)

(58) Field of Classification Search
CPC .... H04R 25/60; H04R 25/556; H04R 31/006; H04R 2225/31; H04R 2460/17;

(Continued)

(56) References Cited

U.S. PATENT DOCUMENTS

| | | | |
|---|---|---|---|
| 2,905,924 A | 9/1959 | Peterson | |
| 4,361,922 A | 12/1982 | Karal | |

(Continued)

FOREIGN PATENT DOCUMENTS

| | | | |
|---|---|---|---|
| DE | 102008024515 B3 * | 4/2010 | ............ H04R 25/55 |
| DE | 102008024515 B3 | 4/2010 | |

(Continued)

OTHER PUBLICATIONS

Communication pursuant to Article 94(3) EPC from counterpart European Application No. 040108.00372 dated Apr. 6, 2023, 5 pp.

(Continued)

*Primary Examiner* — Angelica M McKinney
(74) *Attorney, Agent, or Firm* — Shumaker & Sieffert, P.A.

(57) ABSTRACT

Examples of this disclosure relate to an accessory device for a hearing instrument. The accessory device comprises a connector tip that comprises a first wire segment and a second wire segment. The first and second wire segments are electrically conductive and electrically insulated from each other. The connector tip also comprises a first set of bristles and a second set of bristles. The first and second sets of bristles are electrically conductive. The first set of bristles is electrically connected to the first wire segment and electrically insulated from the second wire segment. The second set of bristles is electrically connected to the second wire segment and electrically insulated from the first wire segment. The first set of bristles is spaced sufficiently far from the second set of bristles as to prevent a short circuit between the first and second sets of bristles.

15 Claims, 14 Drawing Sheets

Related U.S. Application Data

(60) Provisional application No. 62/884,037, filed on Aug. 7, 2019.

(58) Field of Classification Search
CPC ........................ H04R 2420/09; H04R 2225/57; H01R 13/33; H01R 24/58; H01R 13/15
See application file for complete search history.

(56) References Cited

U.S. PATENT DOCUMENTS

| | | | | |
|---|---|---|---|---|
| 5,270,106 | A | 12/1993 | Orlowski et al. | |
| 5,404,105 | A | 4/1995 | Chari | |
| 5,633,701 | A | 5/1997 | Yoshida | |
| 6,167,915 | B1 * | 1/2001 | Collie | H01B 7/189 166/241.1 |
| 9,256,186 | B2 | 2/2016 | Kume et al. | |
| 10,567,891 | B1 * | 2/2020 | Stewart | H04R 25/65 |
| 10,764,667 | B2 | 9/2020 | Higgins et al. | |
| 2008/0232623 | A1 | 9/2008 | Solum et al. | |
| 2020/0186903 | A1 * | 6/2020 | Higgins | A61B 5/6817 |

FOREIGN PATENT DOCUMENTS

| | | | | |
|---|---|---|---|---|
| EP | 2088646 | A1 * | 8/2009 | H01R 13/15 |
| EP | 2088646 | A1 | 8/2009 | |
| JP | 4869655 | B2 | 2/2012 | |
| JP | 2015087486 | A | 5/2015 | |

OTHER PUBLICATIONS

International Preliminary Report on Patentability from International Application No. PCT/US2020/045444, dated Feb. 17, 2022, 8 pp.
International Search Report and Written Opinion of International Application No. PCT/US2020/045444, dated Oct. 29, 2020, 13 pp.
Response to Communication pursuant to Article 94(3) EPC dated Apr. 6, 2023, from counterpart European Application No. 20761048.6 filed Jul. 31, 2023, 81 pp.

* cited by examiner

CONNECTOR TIP WITH BRISTLES FOR HEARING INSTRUMENTS

This application is a continuation of International Application No. PCT/US2020/045444, filed Aug. 7, 2020, which claims the benefit of U.S. Provisional Patent Application 62/884,037, filed Aug. 7, 2019, the entire content of both of which are incorporated herein by reference.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument (or a portion thereof) may be implanted or osseointegrated into a user. Some hearing instruments include additional features beyond just environmental sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes an accessory device for a hearing instrument. The accessory device comprises a connector tip that comprises a first wire segment and a second wire segment. The first and second wire segments are electrically conductive and electrically insulated from each other. The connector tip also comprises a first set of bristles and a second set of bristles. The first and second sets of bristles are electrically conductive. The first set of bristles is electrically connected to the first wire segment and electrically insulated from the second wire segment. The second set of bristles is electrically connected to the second wire segment and electrically insulated from the first wire segment. The first set of bristles is spaced from the second set of bristles as to prevent a short circuit between the first and second sets of bristles due to bending of a bristle of the first or second sets of bristles.

In one example, this disclosure describes an accessory device for a hearing instrument, the accessory device comprising: a connector tip that comprises: a first wire segment and a second wire segment, wherein: the first and second wire segments are electrically conductive and electrically insulated from each other, the first wire segment has a first contact surface configured to provide a first electrical connection between the first wire segment and a first electrical terminal, and the second wire segment has a second contact surface configured to provide a second electrical connection between the second wire segment and a second electrical terminal; and a first set of bristles and a second set of bristles, wherein: the first and second sets of bristles are electrically conductive, the first set of bristles is electrically connected to the first wire segment and electrically insulated from the second wire segment, the second set of bristles is electrically connected to the second wire segment and electrically insulated from the first wire segment, and the first set of bristles is spaced from the second set of bristles as to prevent a short circuit between the first and second sets of bristles due to bending of a bristle of the first or second sets of bristles.

In another example, this disclosure describes a method comprising assembling a connector tip for an accessory device for a hearing instrument, wherein assembling the connector tip comprises: attaching a first set of bristles to an electrically uninsulated portion of a first wire segment, wherein the first set of bristles and the first wire segment are electrically conductive; attaching a second set of bristles to an electrically uninsulated portion of a second wire segment, wherein the second set of bristles and the second wire segment are electrically conductive; positioning the first and second wire segments substantially parallel to one another such that the first and second wire segments are in contact with each other, but no uninsulated portion of the first wire segment is in contact with the uninsulated portion of the second wire segment and no uninsulated portion of the second wire segment is in contact with the uninsulated portion of the first wire segment; and twisting the first and second wire segments around a shared axis such that the first and second sets of bristles spread out radially from the shared axis and the first and second wire segments form a double helix around the shared axis, wherein: after twisting the first and second wire segments, the first set of bristles is spaced from the second set of bristles as to prevent a short circuit between the first and second sets of bristles due to bending of a bristle of the first or second sets of bristles.

The details of one or more aspects of the disclosure are set forth in the accompanying drawings and the description below. Other features, objects, and advantages of the techniques described in this disclosure will be apparent from the description, drawings, and claims.

Figure 5:
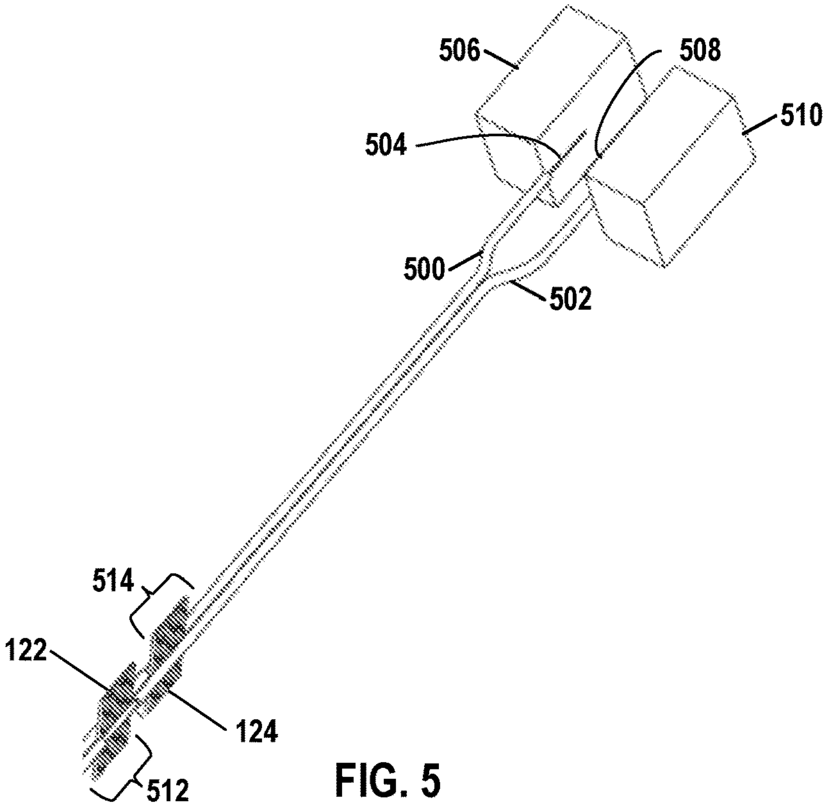
FIG. 5 is a conceptual diagram illustrating an example intermediate stage of manufacturing a connector tip of an accessory device, in accordance with one or more techniques of this disclosure.

4 and FIG. 5 after twisting wire segments of the connector tip to spread sets of bristles, in accordance with one or more techniques of this disclosure.

Figure 7A:
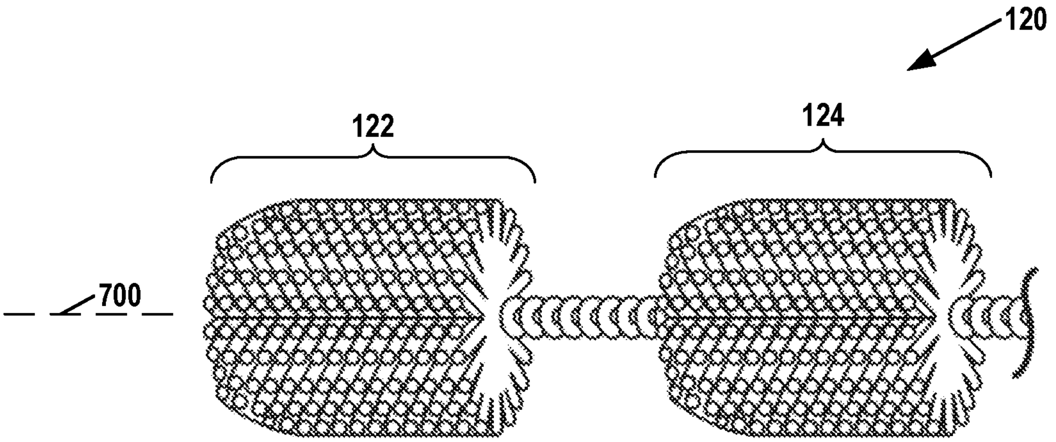
FIG. 7A is a conceptual diagram illustrating example details of the connector tip of the accessory device of FIG.
Figure 7B:
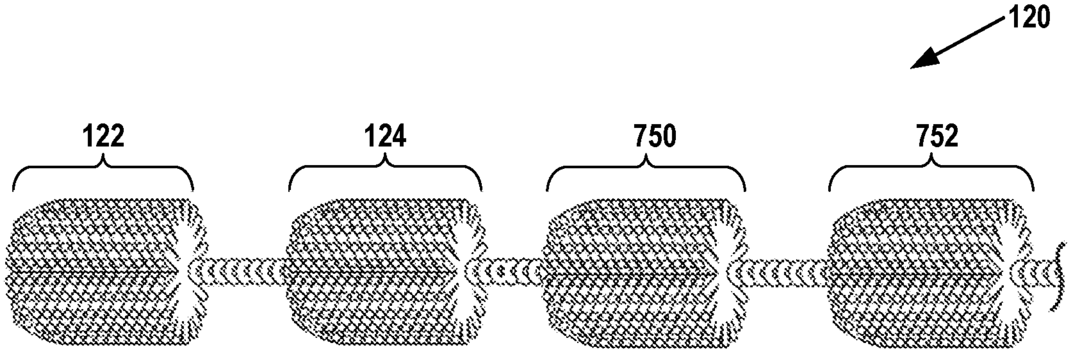

FIG. 7B is a conceptual diagram illustrating example details of the connector tip of the accessory, in which the connector tip includes four sets of bristles, in accordance with one or more techniques of this disclosure.

Figure 8:
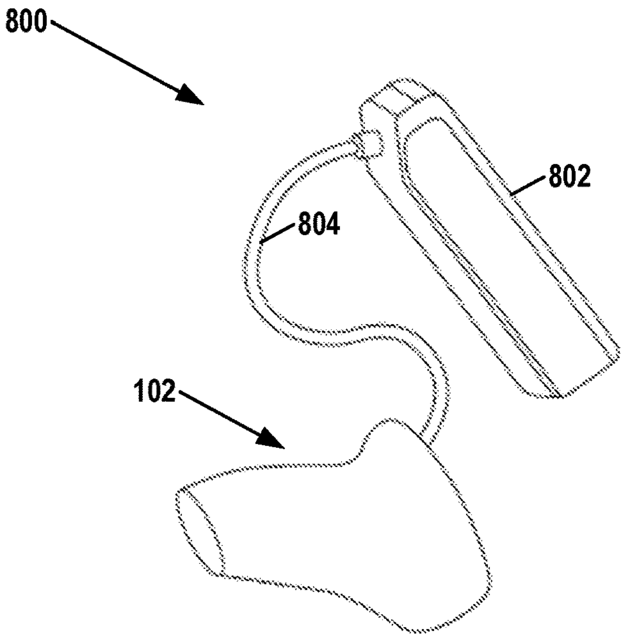

FIG. 8 is a conceptual diagram illustrating an example system that includes a hearing instrument and a behind-the-ear device, in accordance with one or more techniques of this disclosure.

Figure 9:
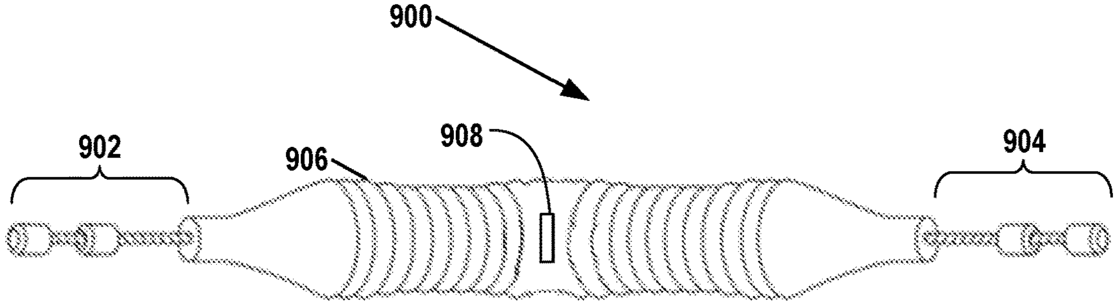

FIG. 9 is a conceptual diagram illustrating an example accessory device in accordance with one or more techniques of this disclosure.

Figure 10:
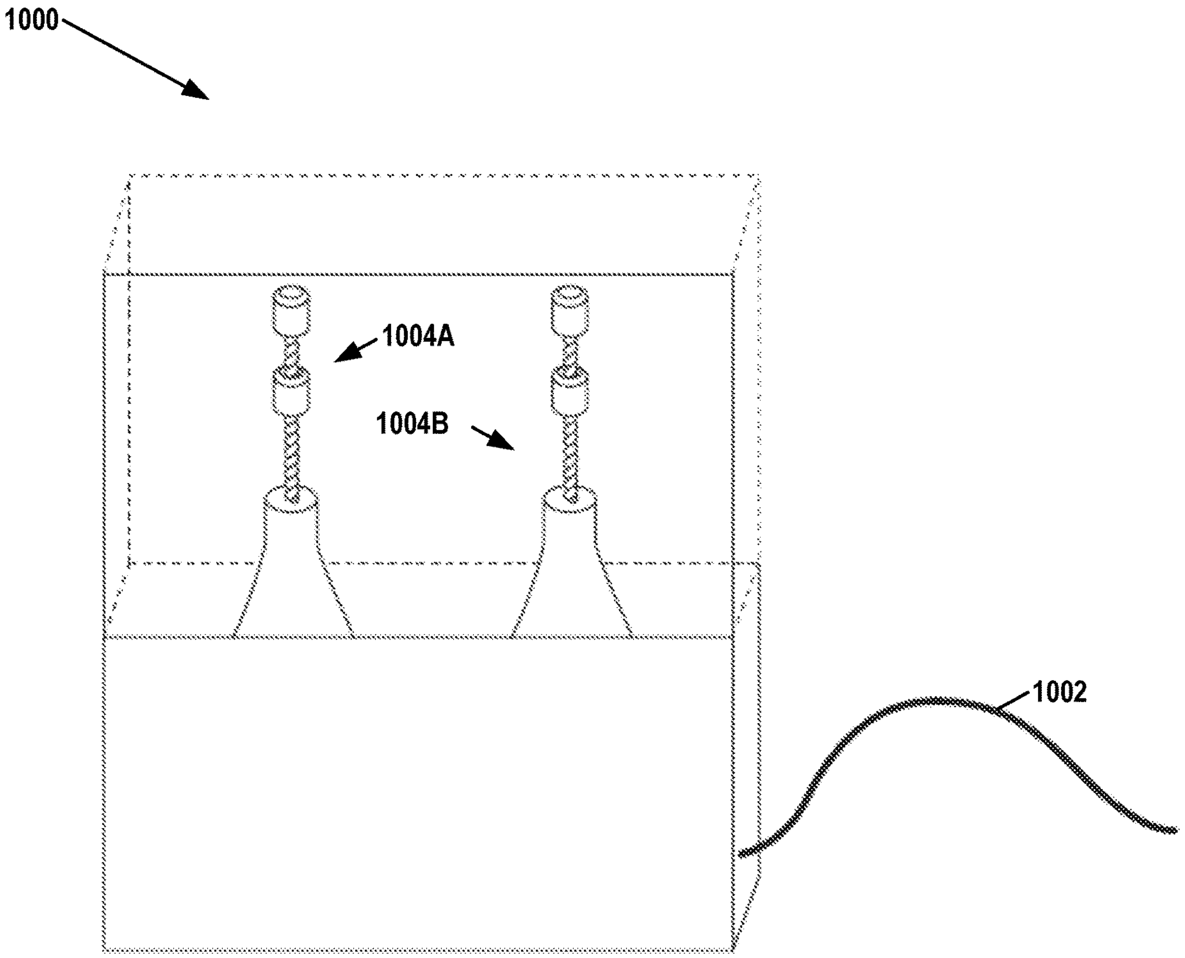

FIG. 10 is a conceptual diagram illustrating an example charging case accessory device in accordance with one or more techniques of this disclosure.

Figure 11:
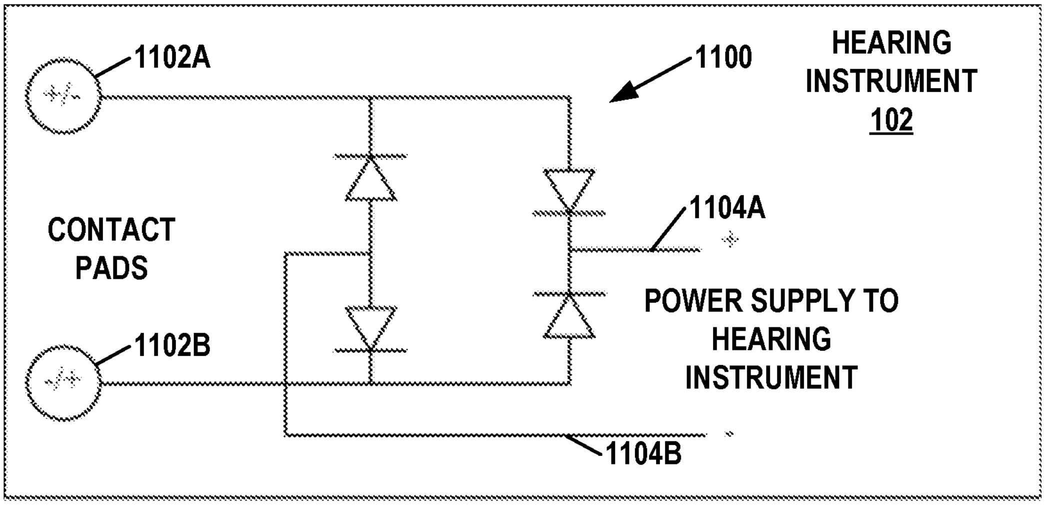

FIG. 11 is a circuit diagram illustrating an example full-bridge rectifier for use in a hearing instrument, in accordance with one or more techniques of this disclosure.

Figure 12:
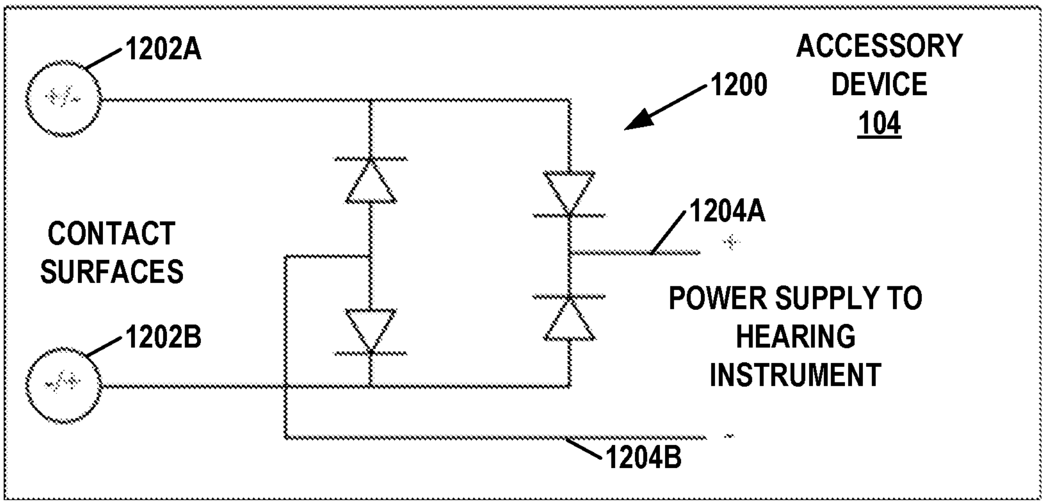

FIG. 12 is a circuit diagram illustrating an example full-bridge rectifier for use in an accessory device, in accordance with one or more techniques of this disclosure.

Figure 13:
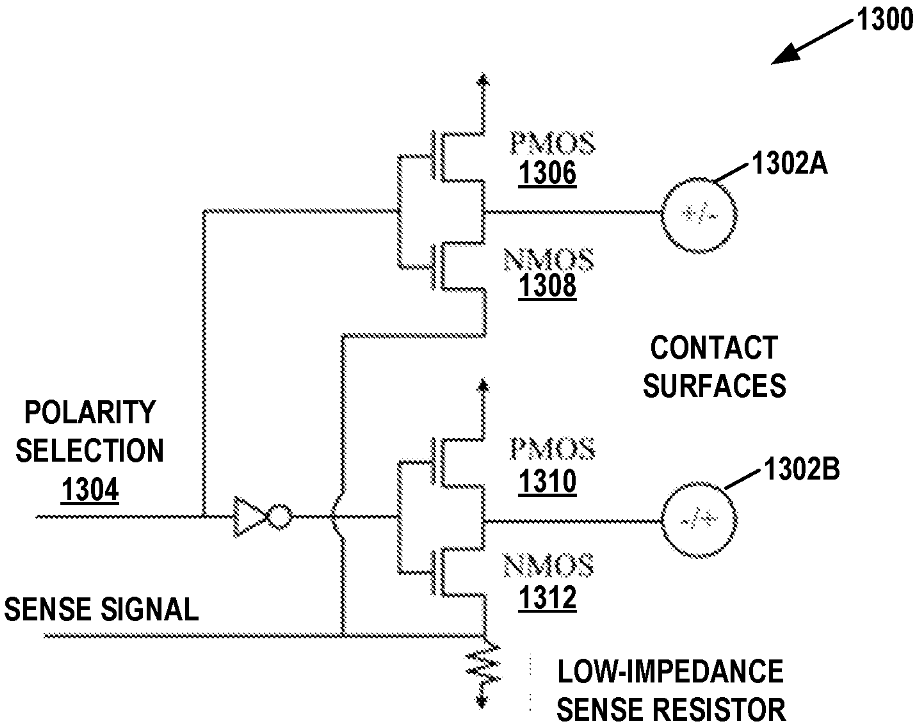

FIG. 13 is a circuit diagram illustrating an example circuit for sensing and switching polarity in a charger device, in accordance with one or more techniques of this disclosure.

Figure 14:
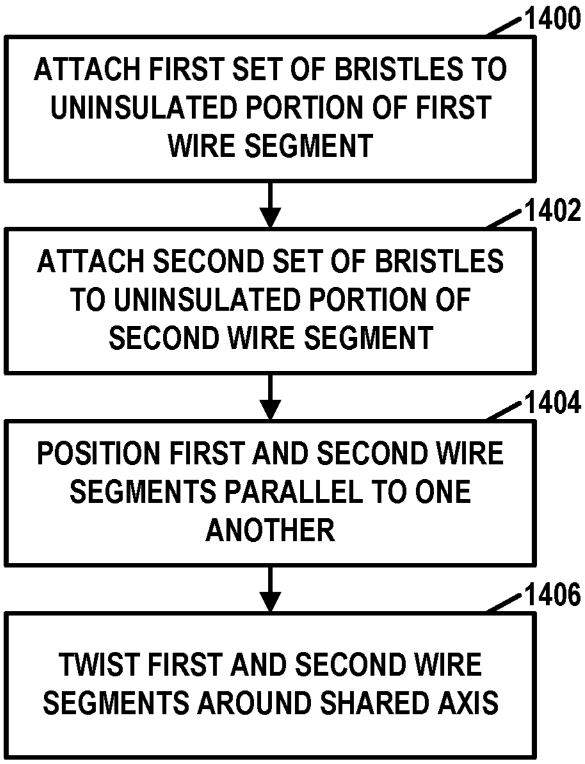

FIG. 14 is a flowchart illustrating an example operation for assembling a connector tip for an accessory device for a hearing instrument, in accordance with one or more techniques of this disclosure.

Figure 15:
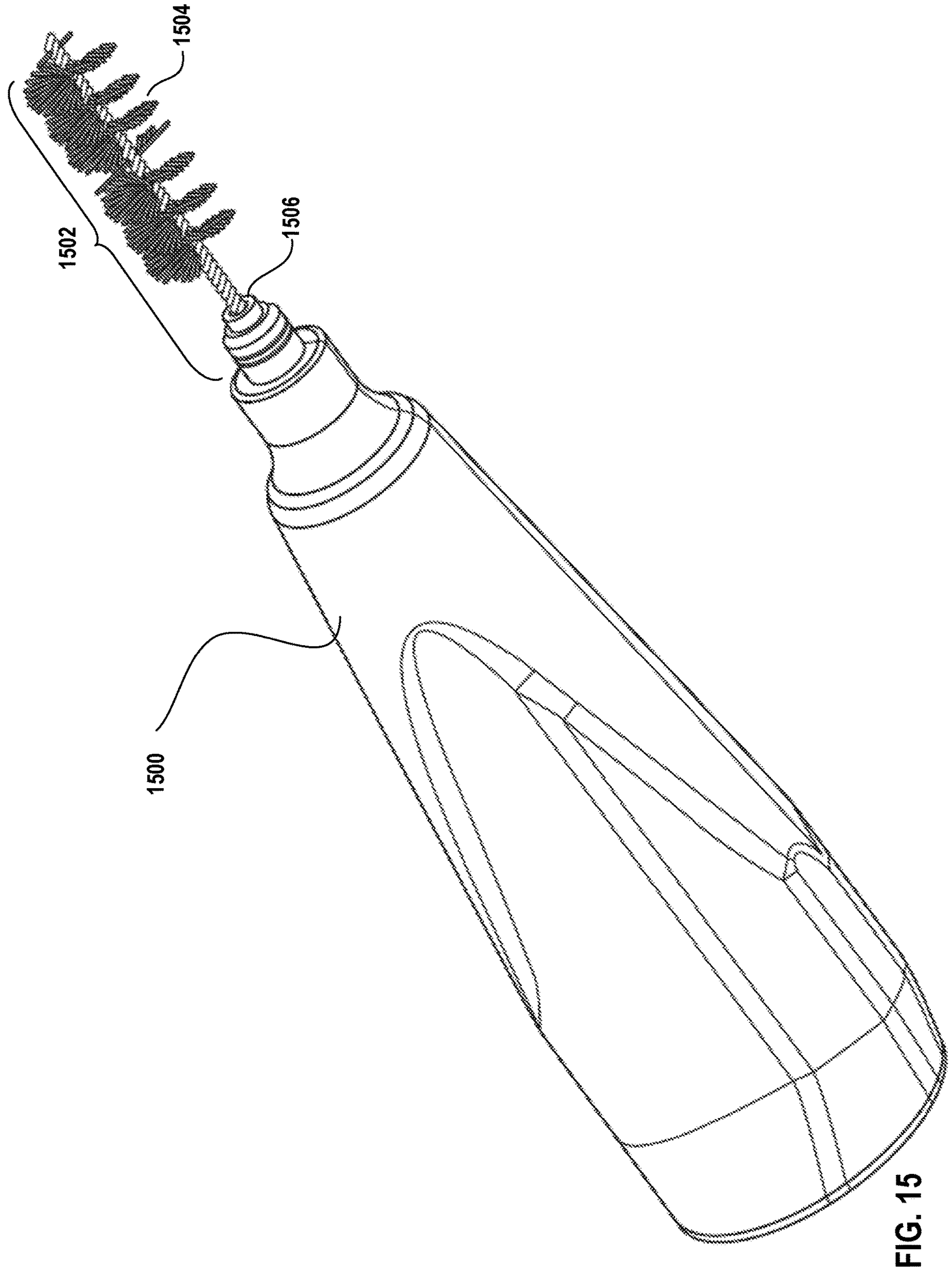

FIG. 15 is a conceptual diagram illustrating an example accessory device in accordance with one or more techniques of this disclosure.

Figure 16:
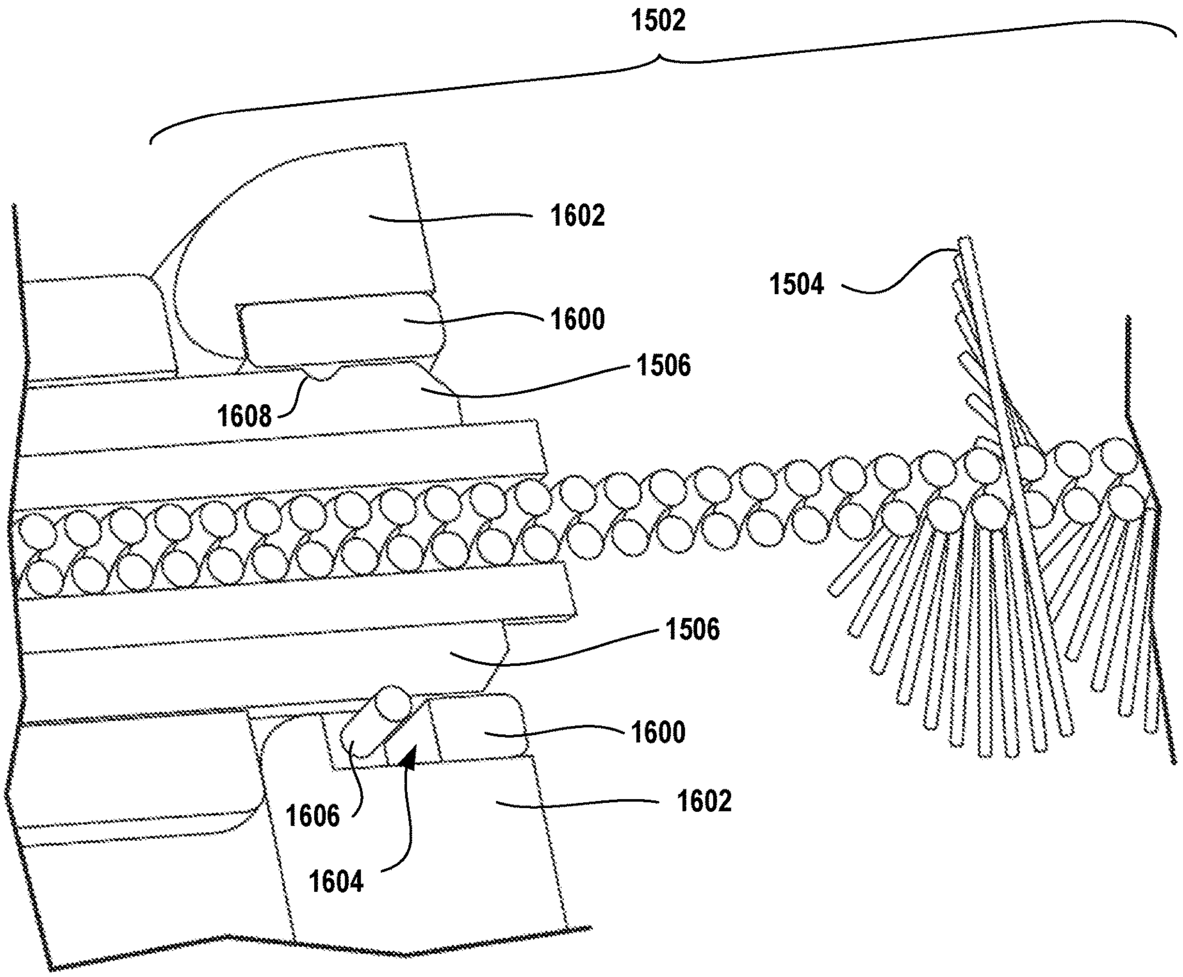

FIG. 16 is a cross-section view of an example base portion of a connector tip of FIG. 15 in accordance with one or more techniques of this disclosure.

Figure 17:
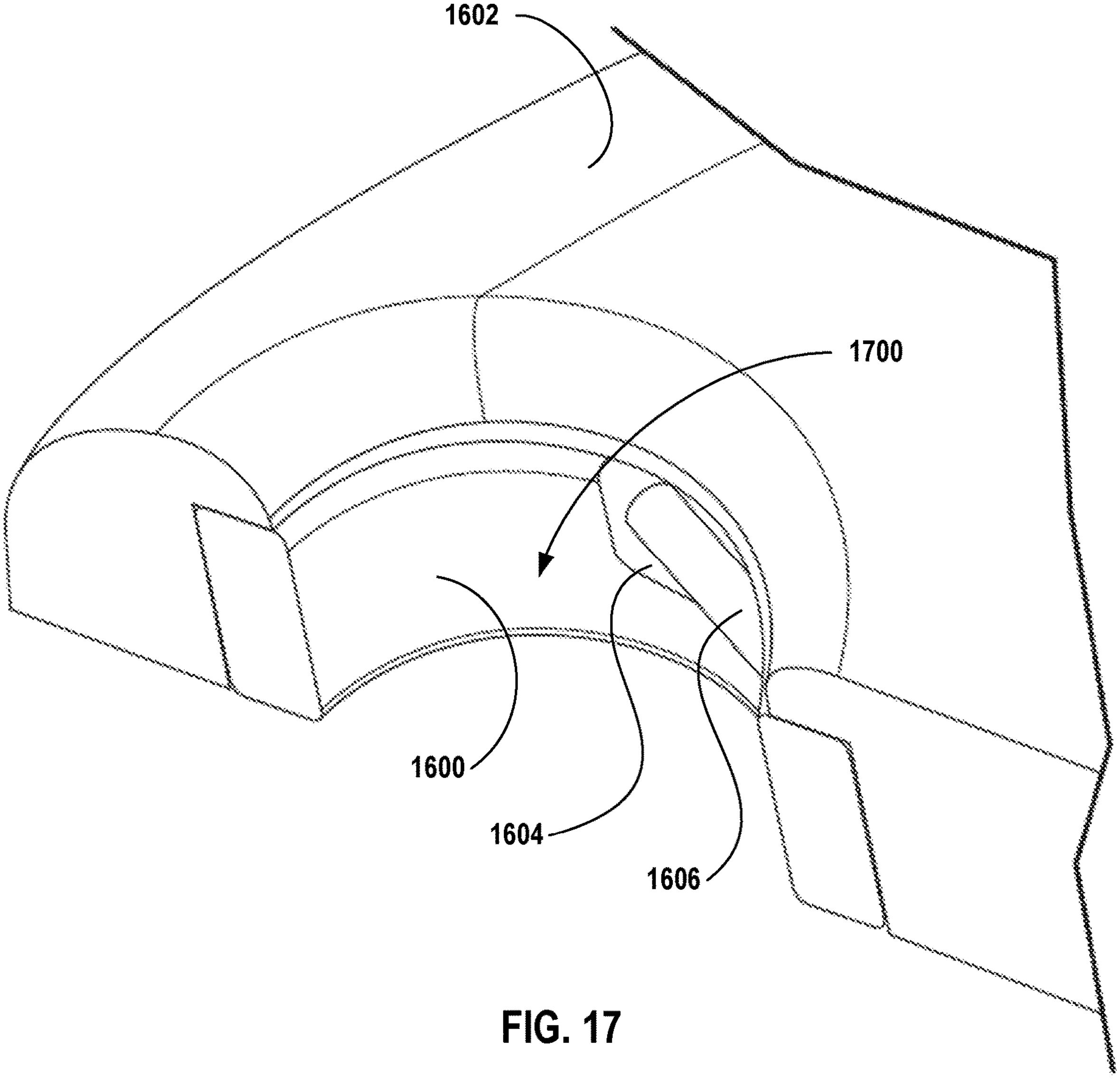

FIG. 17 is a cutaway view of an example portion of a hearing instrument configured for engagement with the connector tip of FIG. 16.

Figure 18:
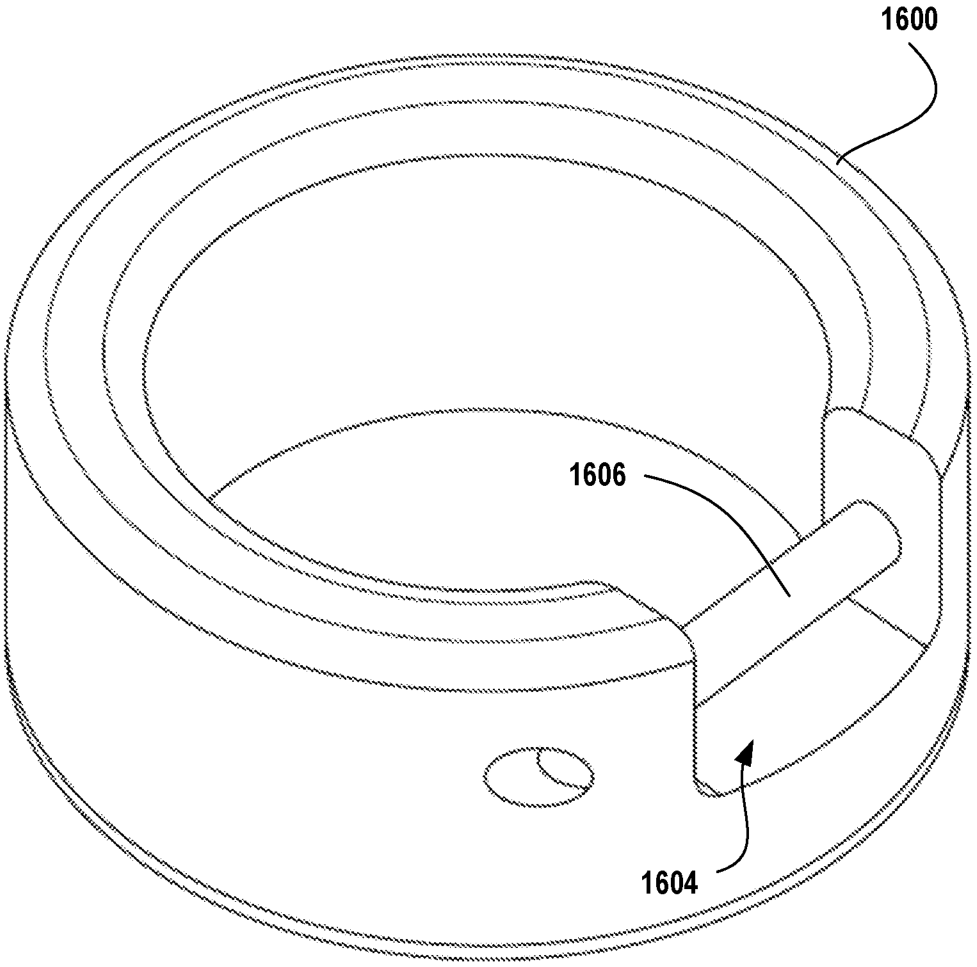

FIG. 18 is a perspective view of an example bushing in accordance with one or more techniques of this disclosure.

DETAILED DESCRIPTION

A hearing instrument may contain a rechargeable battery that provides electrical energy to various electronic components of the hearing instrument. Additionally, it may be desirable for hearing instruments to have cable-based communication capabilities. However, attaching power and communication cables to hearing instruments has proven to be challenging. Many in-ear hearing instruments are tailored to fit the unique anatomical shapes of individual users' ear canals. The resulting variability in the size and shape of in-ear hearing instruments may make it difficult to design places to attach cables to the in-ear hearing instrument. Additionally, in prior hearing instruments, attachment points of such cables may involve moving parts that are susceptible to debris or water intrusion and may be prone to mechanical fatigue.

Many hearing instruments, such as hearing aids or other ear-wearable devices, have vents that allow internally generated sound to exit the user's ear canal from portions of users' ear canals medial to the hearing instruments and the outside environment. Thus, a hearing instrument may have a shell formed (e.g., molded) for wear in an ear of a user. For instance, the shell may be shaped such that at least a portion of the shell may be inserted into an ear canal of an ear of the user. The shell has a lateral surface and a medial surface. The lateral surface of the shell is distal to a midline of the user when the hearing instrument is worn by the user. The medial surface of the shell is proximal to the midline of the user when the hearing instrument is worn by the user. Furthermore, the shell has a tunnel wall. The tunnel wall is a portion of the shell shaped to define a tunnel that passes through the in-ear hearing instrument from the lateral surface of the shell to the medial surface of the shell and is open at both the lateral surface of the shell and the medial surface of the shell.

In accordance with the techniques of this disclosure, two or more electrical contact pads (which may be referred to herein simply as "contact pads") are positioned within the shell. The contact pads are conductors from one or more electrical components (e.g., a rechargeable battery, processor, etc.) that are encased within the shell. The tunnel wall defines one or more electrical contact pad apertures (which may be referred to herein simply as "contact pad apertures") through which distal ends of the electrical contact pads pass. For example, the tunnel wall may define a first contact pad aperture through which a distal end of a first contact pad passes and the tunnel wall may define a second contact pad aperture through which a distal end of a second contact pad passes. In another example, the tunnel wall may define a contact pad aperture through which the distal ends of both a first contact pad and a second contact pad pass. The distal ends of the contact pads are positioned to make electrical contact with terminals of a connector tip that is removably inserted into the tunnel.

In accordance with one or more techniques of this disclosure, an accessory device may have a connector tip. The connector tip includes at least a first wire segment and a second wire segment. The first and second wire segments are electrically conductive and electrically insulated from each other. The first wire segment has a first contact surface configured to provide a first electrical connection between the first wire segment and a first electrical terminal. The second wire segment has a second contact surface configured to provide a second electrical connection between the second wire segment and a second electrical terminal. The first and second electrical terminals may be terminals of a battery in the accessory device, terminals of wires connected to electrical components of the accessory device, terminals of a cable connected to another device, and so on. Additionally, the connector tip includes a first set of bristles and a second set of bristles. The first and second sets of bristles are electrically conductive. The first set of bristles is electrically connected to the first wire segment and electrically insulated from the second wire segment. The second set of bristles is electrically connected to the second wire segment and electrically insulated from the first wire segment.

When the connector tip is inserted into the tunnel of the hearing instrument, the first set of bristles may make an electrical connection with the first contact pad of the hearing instrument and the second set of bristles may make an electrical connection with the second contact pad of the hearing instrument. Thus, the first and second wire segments, the first and second sets of bristles, the first and second contact pads of the hearing instruments, and one or more electrical components of the hearing aid may form an electrical circuit when the connector tip is inserted into the tunnel. A current passing through this electrical circuit may charge a rechargeable battery of the hearing instrument, may be modulated to communicate data to or from the hearing instrument, or may serve other purposes.

Because the contact pads are in the tunnel, it may be unnecessary for there to be a separate opening in the hearing instrument to insert the connector tip. This may save space within the hearing instrument, e.g., for other components or may reduce the overall size of the hearing instrument. Moreover, this may allow for more optimal placement of other components, such as antennas, telecoils, push buttons, rotary volume controls, and so on. Furthermore, because the contact pads are in the tunnel, they are not exposed on the outer surface of the hearing instrument where they may more easily be damaged.

Moreover, in prior hearing instruments that include a separate socket into which the tip of a cable in inserted, debris can accumulate in the socket. This debris may prevent terminals of a connector tip from making good contact with contact pads in the socket. The debris may be difficult to remove without special tools. However, in the examples of this disclosure, because the contact pads are in the tunnel and the tunnel is open at both the lateral and medial surfaces of the hearing instruments, debris (e.g., ear-generated materials, dust, lint, etc.) that falls into the tunnel can simply be pushed out one side of the tunnel by inserting the connector tip of this disclosure or other small thin object through the tunnel. Moreover, the bristles of the connector tip of this disclosure may make a scratching connection with the contact pads, which may clean away debris from the contact pads, which may help to ensure a reliable electrical connection. Furthermore, prior hearing instruments have used moving contact pads, such as spring-loaded pogo pins and contact arms, to provide electrical connections to the terminals of connector tips. However, moving contact pads are prone to failure due to debris ingress and/or mechanical fatigue failures. Hearing instruments manufactured in accordance with the techniques of this disclosure do not need to include moving contact pads.

Figure 1:
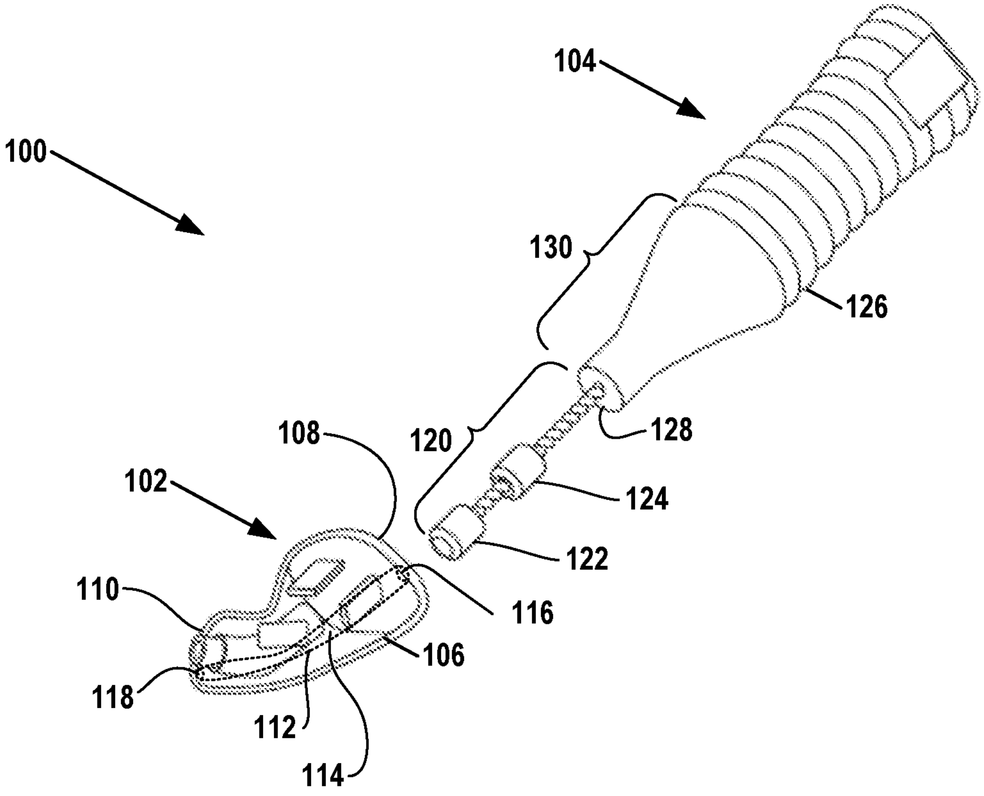
FIG. 1 is a conceptual diagram illustrating an example system that includes a hearing instrument and an accessory device, in accordance with one or more techniques of this disclosure.

FIG. 1 is a conceptual diagram illustrating an example system 100 that includes a hearing instrument 102 and an accessory device 104, in accordance with one or more techniques of this disclosure. System 100 is an example and other example of the techniques of this disclosure are described elsewhere in this disclosure. However, for ease of explanation, continued reference is made to FIG. 1 throughout this disclosure.

Hearing instrument 102 may be a hearing aid, earphone, earbud, earpiece, and another type of device designed to be worn at least partially in a user's ear. As shown in FIG. 1, hearing instrument 102 includes a shell 106. Shell 106 is formed (e.g., molded) into a shape that can be worn in an ear of a user. For instance, shell 106 may be formed (e.g., molded) into a shape suitable for insertion at least partially into an ear canal of a user. In some examples, hearing instrument 102 may be an in-the-ear device and shell 106 may be formed (e.g., molded) for wear outside an ear canal of a user. In some examples, shell 106 may be custom formed (e.g., molded) to fit the unique anatomy of an individual user's ear and/or ear canal. In some examples, shell 106 may be made of a flexible material or an elastomer, such as silicone rubber or other flexible material. Shell 106 may have different shapes and styles than that shown in the example of FIG. 1.

Shell 106 has a lateral surface 108 and a medial surface 110. In some examples, lateral surface 108 is a faceplate of hearing instrument 102. Lateral surface 108 of shell 106 is distal to a midline of the user when hearing instrument 102 is worn by the user. The midline of the user is considered to be a plane running vertically through the center of the user's body when the user is standing, the plane running from the anterior side of the user's body to the posterior side of the user's body. Medial surface 110 of shell 106 is proximal to the midline of the user when hearing instrument 102 is worn by the user.

Shell 106 includes a tunnel wall 112. Tunnel wall 112 is a portion of shell 106 shaped to define a tunnel 114 that passes through hearing instrument 102 from lateral surface 108 to medial surface 110. Tunnel 114 is open at both ends. Thus, tunnel wall 112 defines tunnel 114 such that tunnel 114 has a lateral portal 116 and a medial portal 118. In some examples, tunnel 114 may be a vent that allows internally generated sound to escape from a portion of the user's ear canal medial to hearing instrument 102 and the outside environment. Thus, in some such examples, shell 106 may be shaped such that during wear of hearing instrument 102, medial portal 118 of tunnel 114 is located inside an ear canal of the ear of the user. In some examples, shell 106 is shaped such that during wear of hearing instrument 102, medial portal 118 of tunnel 114 is located in a concha of the ear of the user. Because tunnel 114 is open at both ends, debris may be cleaned from tunnel 114 by pushing the debris out an opposite end of tunnel 114.

As shown in the example of FIG. 1, a connector tip 120 of accessory device 104 may be inserted into lateral portal 116 of tunnel 114 or medial portal 118 of tunnel 114. Connector tip 120 includes a first set of bristles 122 and a second set of bristles 124. As shown and described in greater detail elsewhere in this disclosure, bristles 122, 124 may be attached to a first wire segment and a second wire segment of connector tip 120. In the example of FIG. 1, bristles 122, 124 may each comprise a cylindrically shaped arrays of bristles. In other examples, bristles 122, 124 may have other shapes. Although not shown in the example of FIG. 1, connector tip 120 may include other sets of bristles.

As noted above, bristles 122, 124 are connected to a first and a second wire segment of connector tip 120. The first and second wire segments of connector tip 120 are electrically conductive and electrically insulated from each other. Furthermore, sets of bristles 122, 124 are also electrically conductive. Bristles 122 are electrically connected to the first wire segment and electrically insulated from the second wire segment. Bristles 124 are electrically connected to the second wire segment and electrically insulated from the first wire segment. Bristles 122 are spaced from bristles 124 as to prevent a short circuit between bristles 122 and bristles 124 due to bending of one or more bristles of the bristles 122 or bristles 124.

As described in greater detail elsewhere in this disclosure, contact pads positioned within tunnel 114 may come into electrical contact with bristles 122, 124 when connector tip 120 is inserted into tunnel 114. This may enable a user to use accessory device 104 to recharge a battery of hearing instrument 102, exchange data between hearing instrument 102 and another device, or perform other activities. In some examples, the contact pads positioned within tunnel 114 may come into electrical contact with bristles 122, 124 when connector tip 120 is inserted into either lateral portal 116 or medial portal 118 of tunnel 114. Thus, an electrical circuit may include the first wire segment of connector tip 120, one or more electronic components of hearing instrument 102, and the second wire segment of connector tip 120.

To summarize, hearing instrument 102 comprises a shell 106 shaped for wearing in an ear of a user. Shell 106 comprises tunnel wall 112. Tunnel wall 112 is a portion of the shell shaped to define a tunnel 114 that is open-ended and passes through hearing instrument 102. Two or more contact pads are positioned within shell 106. Tunnel wall 112 is shaped such that tunnel wall 112 defines one or more contact pad apertures through which distal ends of the contact pads of hearing instrument 102 pass. One or more electrical components (e.g., batteries, processors, etc.) are encased within shell 106. The contact pads are conductors from the one or more electrical components. The distal ends of the contact pads are positioned to make electrical contact with bristles 122, 124 of connector tip 120 that is removably inserted into tunnel 114. For example, when connector tip 120 is inserted into tunnel 114, bristles 122 of connector tip 120 are in electrical contact with the distal end of the first contact pad and bristles 124 of connector tip 120 are in electrical contact with the distal end of the second contact pad.

The wire segments and bristles 122, 124 of connector tip 120 may carry an electrical current that charges a rechargeable battery of hearing instrument 102. Thus, a user may insert connector tip 120 into tunnel 114 of hearing instrument 102 when the user wants to recharge the battery of hearing instrument 102.

In the example of FIG. 1, accessory device 104 may include a handle 126 from which connector tip 120 protrudes. Handle 126 may enable a user to easily grasp accessory device 104 for insertion of connector tip 120 into tunnel 114. Handle 126 may contain one or more internal components, such as a rechargeable battery, one or more sensors (e.g., health-monitoring sensors, location sensors, etc.), a charging port, a wireless communication system, and/or other components. In some examples, handle 126, or a portion thereof, is formed (e.g., over-molded) over a section of the wire segments of connector tip 120.

In some examples, such as the example of FIG. 1, accessory device 104 includes a stop member 128 at a distance from a distal tip of connector tip 120 appropriate for stopping over-insertion of connector tip 120 into tunnel 114 of hearing instrument 102. For instance, in the example of FIG. 1, stop member 128 forms part of handle 126. Over-insertion may occur when bristles 122, 124 move past a first contact pad and a second contact pad of hearing instrument 102 as to prevent reliable electrical contact between the first set of bristles and the first contact pad and to prevent reliable electrical contact between the second set of bristles and the second contact pad. Although shown in the example of FIG. 1 as being part of handle 126, stop member 128 may, in other examples, be separate from handle 126 or a part of another component of an accessory device.

In some examples, connector tip 120 is detachable from handle 126. For instance, in the example of FIG. 1, the wire segments and bristles 122, 124, along with cone-shaped body 130 may be detachable from handle 126. This may allow a user to replace connector tip 120 (and cone-shaped body 130) if bristles 122, 124 of connector tip 120 are damaged or wear out. Although not shown in the example of FIG. 1, a cable may be connected to handle 126. In some examples, the cable is detachable from handle 126. The cable may carry electrical current to handle 126.

Figure 2:
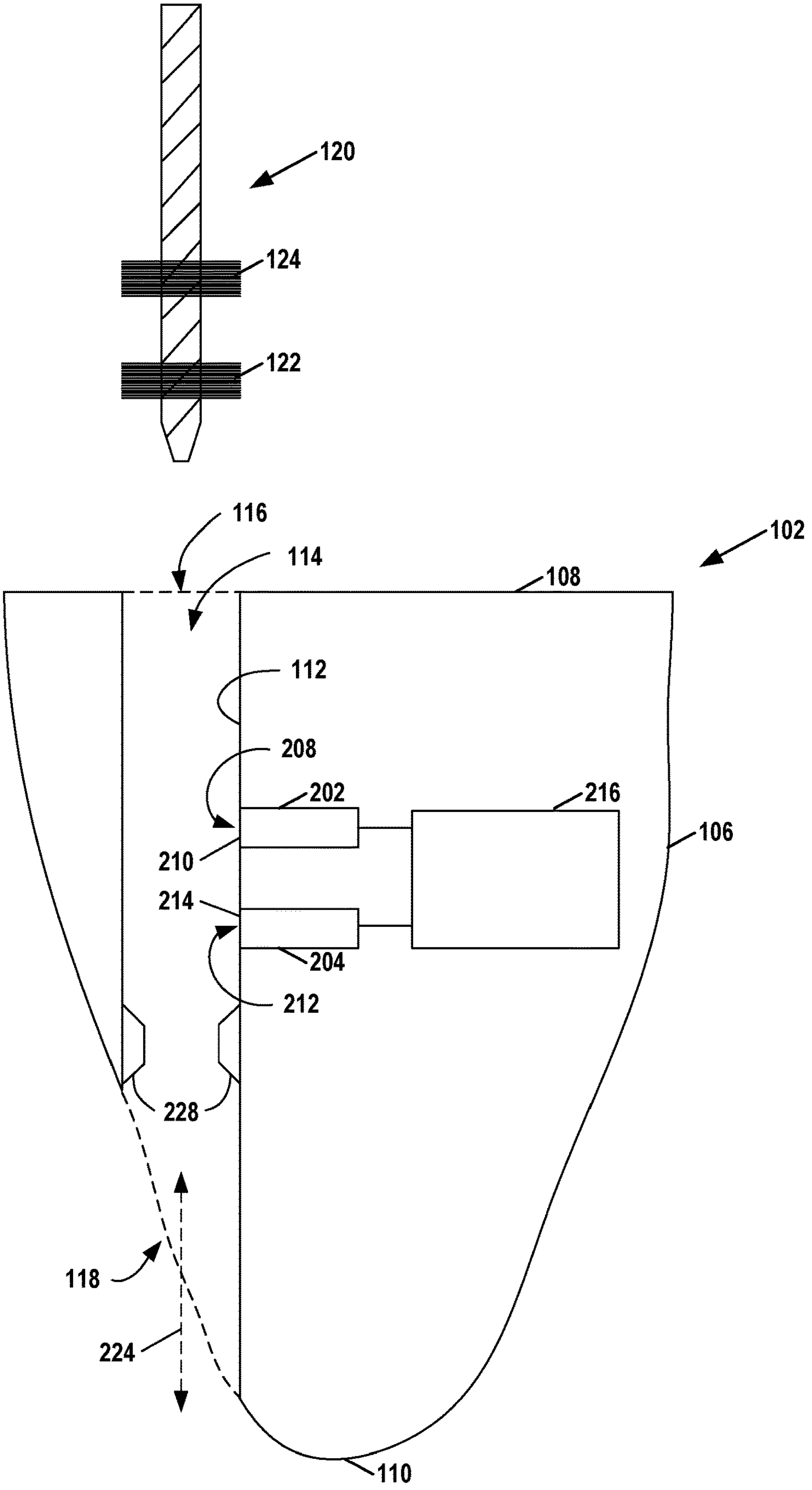
FIG. 2 is a conceptual diagram illustrating an example cross-section of the hearing instrument of FIG. 1 and the connector tip of FIG. 1, in accordance with one or more techniques of this disclosure.

FIG. 2 is a conceptual diagram illustrating an example cross-section of hearing instrument 102 of FIG. 1 and connector tip 120 of FIG. 1, in accordance with one or more techniques of this disclosure. As shown in FIG. 2, a first contact pad 202 and a second contact pad 204 are positioned within shell 106. In other examples, additional contact pads may be positioned within shell 106. Shell 106 includes a tunnel wall 112 that is shaped to define tunnel 114. Although the example of FIG. 2 shows tunnel 114 as being straight, tunnel 114 may curve within hearing instrument 102. Furthermore, in the example of FIG. 2, tunnel wall 112 defines a contact pad aperture 208 through which a distal end 210 of contact pad 202 passes. In the example of FIG. 2, tunnel wall 112 also defines a second contact pad aperture 212 through which a distal end 214 of contact pad 204 passes. Tunnel wall 112 may be considered to be limited to the tube-shaped portion of shell 106 from lateral portal 116 of tunnel 114 through hearing instrument 102 to medial portal 118 of tunnel 114.

In some examples, contact pad 202 and contact pad 204 are mounted within shell 106 such that contact pad 202 and contact pad 204 are immovable relative to shell 106. For instance, in the example of FIG. 2, contact pad 202 and contact pad 204 are not designed for movement in a direction substantially parallel or orthogonal to lengthwise axis 224 of tunnel 114. Because contact pad 202 and contact pad 204 are immovable relative to shell 106, contact pad 202 and contact pad 204 are not moving parts and may therefore be less susceptible to debris intrusion or mechanical fatigue than moving parts like pogo pins. Furthermore, because contact pad 202 and contact pad 204 are immovable relative to shell 106, shell 106 can be made waterproof or water-resistant because a waterproof or water-resistant membrane does not need to be flexible to accommodate movable contact pads. Thus, in some such examples, hearing instrument 102 may be submersible, even allowing the user to wear hearing instrument 102 while swimming or showering.

One or more electrical components 216 are encased within shell 106. Contact pad 202 is a first conductor from electrical components 216. Distal end 210 of contact pad 202 may be a first terminal of the first conductor. Contact pad 204 is a second conductor from electrical components 216. Distal end 214 of contact pad 204 may be a second terminal of the second conductor. For instance, distal end 210 of contact pad 202 may be a positive terminal and distal end 214 of contact pad 204 may be a negative terminal.

Electrical components 216 may comprise various types of electrical or electronic components. For example, electrical components 216 may include a rechargeable battery. In other words, hearing instrument 102 may comprise a battery configured to be recharged using electrical energy supplied through connector tip 120, contact pad 202, and contact pad 204. In such examples, the configuration of contact pads 202, 204 may support standard and high-speed charging. In some examples, electrical components 216 include communication units configured to receive information from other computing devices. For instance, in one example, a communication unit may be configured to receive data that configures hearing instrument 102 for processing sound for a user. In other words, electrical components 216 may comprise circuitry configured to process data transmitted to hearing instrument 102 through connector tip 120, contact pad 202, and contact pad 204. In some examples, a communication unit may be configured to receive media data.

In some examples, hearing instrument 102 may include more than the two contact pads shown in FIG. 2. For instance, in one example, the one or more electrical components 216 may include a battery configured to be recharged using electrical energy supplied through the connector tip and a first set of two or more of the contact pads, and other ones of the electrical components 216 may be configured to process data transmitted to hearing instrument 102 through connector tip 120 and a second set of two or more of the contact pads, which may include one or more contact pads different from the first set of contact pads.

As shown in the example of FIG. 2, connector tip 120 includes bristles 122, 124. Bristles 122, 124 may extend 360-degrees around connector tip 120, thereby potentially allowing 360 rotation of connector tip 120 while at least some of bristles 122 and bristles 124 maintain electrical contact with contact pad 202 and contact pad 204. Bristles 122 may be electrically connected to a first wire segment in connector tip 120 and bristles 124 may be electrically connected to a second wire segment in connector tip 120.

Although not shown in the example of FIG. 2, hearing instrument 102 may include more than two contact pads that are similarly disposed with respect to tunnel 114 as contact pad 202 and contact pad 204. For example, contact pad 202 and contact pad 204 may serve to provide electrical energy to recharge a battery of hearing instrument 102 and two additional contact pads disposed within tunnel 114 may be used for communication of data between hearing instrument 102 and another device via a cable.

Figure 3:
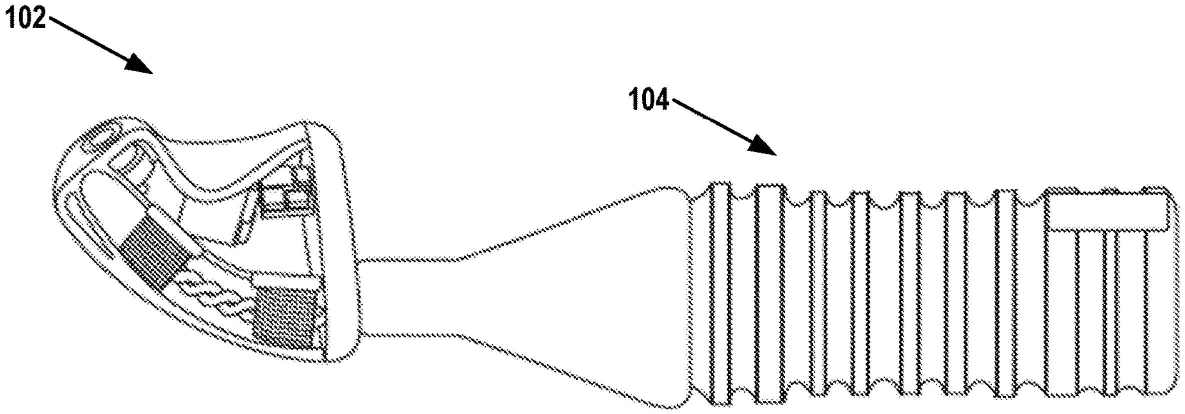
FIG. 3 is a conceptual diagram illustrating an example cross-section of a hearing instrument with a connector tip of an accessory device inserted into a tunnel that passes through the hearing instrument, in accordance with one or more techniques of this disclosure.
Figure 4:
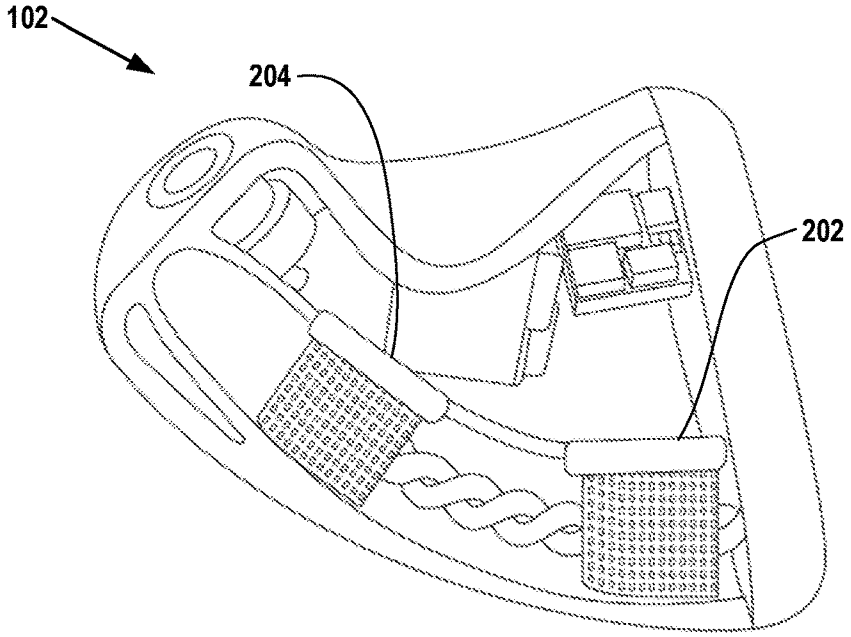
FIG. 4 is a conceptual diagram illustrating in greater detail an example cross-section of a hearing instrument with a connector tip inserted into a tunnel that passes through the hearing instrument, in accordance with one or more techniques of this disclosure.

FIG. 3 is a conceptual diagram illustrating an example cross-section of hearing instrument 102 with connector tip 120 of accessory device 104 inserted into tunnel 114 that passes through hearing instrument 102, in accordance with one or more techniques of this disclosure. FIG. 4 is a conceptual diagram illustrating in greater detail an example cross-section of a hearing instrument with a connector tip inserted into a tunnel that passes through the hearing instrument, in accordance with one or more techniques of this disclosure. As shown in the example of FIG. 4, hearing instrument 102 includes a receiver 400 and other electrical components. Hearing instrument 102 also includes contact pad 202 and contact pad 204.

As shown in the examples of FIG. 3 and FIG. 4, at least some bristles of bristles 122 make contact with contact pad 202 and at least some bristles of bristles 124 make contact with contact pad 204 when connector tip 120 is inserted into tunnel 114. Because of the spacing of bristles 122 from bristles 124, a stray bristle of bristles 122 cannot reach contact pad 202 and a stray bristle of bristles 124 cannot reach contact pad 204 when connector tip 120 is inserted into tunnel 114. Thus, the spacing may help to prevent a short circuit caused by one of bristles 122 touching contact pad 204 or bristles 124 or a short circuit caused by one of bristles 124 touching contact pad 202 or bristles 122.

To help ensure reliable contact between bristles 122, 124 and contact pads 202, 204, a cross-sectional diameter of bristles 122, 124 is larger than a diameter of tunnel 114. This may ensure that each of bristles 122, 124 bends when entering tunnel 114. The springback force of bristles 122, 124 caused by bending of bristles 122, 124 may create a radial compressive force sufficient to ensure a stable connection between bristles 122, 124 and contact pads 202, 204.

Additionally, the radial compressive force may cause bristles 122, 124 to make a scratching-type contact with contact pads 202, 204. Thus, the insertion of connector tip 120 into tunnel 114 may cause bristles 122, 124 to clean away debris (e.g., lint, skin cells, earwax, oils, etc.) from contact pads 202, 204. Cleaning away such debris may help to ensure reliable electrical contact between bristles 122, 124 and contact pads 202, 204. In other words, bristles 122, 124 may have sufficient rigidity to brush ear-generated materials (e.g., oils, earwax, skin cells, etc.) from contact pads 202, 204 of hearing instrument 102.

Furthermore, as noted elsewhere in this disclosure, electrical contact may be made between bristles 122 and contact pad 204 and electrical contact may be made between bristles 124 and contact pad 202 when connector tip is inserted into tunnel 114. Because connector tip 120 is inserted into tunnel 114 and tunnel 114 is open-ended at two ends, insertion of connector tip 120 into one of portals 116, 118 may push debris, such as earwax and lint, out the other one of portals 116, 118. In other words, in some examples, at least bristles 122 (and in some examples, bristles 124) have sufficient rigidity such that when connector tip 120 is inserted into a first portal (e.g., lateral portal 116 or medial portal 118) of tunnel 114 of hearing instrument 102, bristles 122 are able to push ear-generated materials out a second portal (e.g., lateral portal 116 or medial portal 118) of tunnel 114.

Furthermore, as shown in the examples of FIG. 3 and FIG. 4, tunnel wall 112 may define tunnel 114 such that tunnel 114 has a curved shape. Allowing tunnel 114 to have a curved shape may enable shell 106 of hearing instrument 102 to have a wider variety of shapes, which may result in increased user comfort. Additionally, allowing tunnel 114 to have a curved shape may provide greater design flexibility to a designer of hearing instrument 102. For instance, using a curved shape may enable the designer of hearing instrument 102 to place internal components of hearing instrument 102 in a wider variety of places within shell 106.

In some examples, connector tip 120 is bendable under force sufficient to insert connector tip 120 into a curved tunnel 114 of hearing instrument 102. Furthermore, in such examples, connector tip 120 returns at least partially to an original shape upon removal of connector tip 120 from the curved tunnel 114 of hearing instrument 102. For instance, in one example, when connector tip 120 is not inserted into any other object (e.g., as shown in FIG. 1), connector tip 120 may be straight. In this example, connector tip 120 may bend when inserted into tunnel 114 and may return to being straight when removed from tunnel 114. In other examples, connector tip 120 may originally be curved or connector tip 120 may retain some of bend resulting from insertion of connector tip 120 into tunnel 114. A springback force of connector tip 120 is a force of connector tip 120 to return to an original (e.g., straight) shape of connector tip 120. In some examples, the springback force of connector tip 120 may be sufficient to assist with preventing connector tip 120 from passively falling out of curved tunnel 114 of hearing instrument 102. In other words, the friction caused by the springback force may help bristles 122, 124 hold connector tip 120 in tunnel 114 until user pulls connector tip 120 out of tunnel 114.

Figure 6:
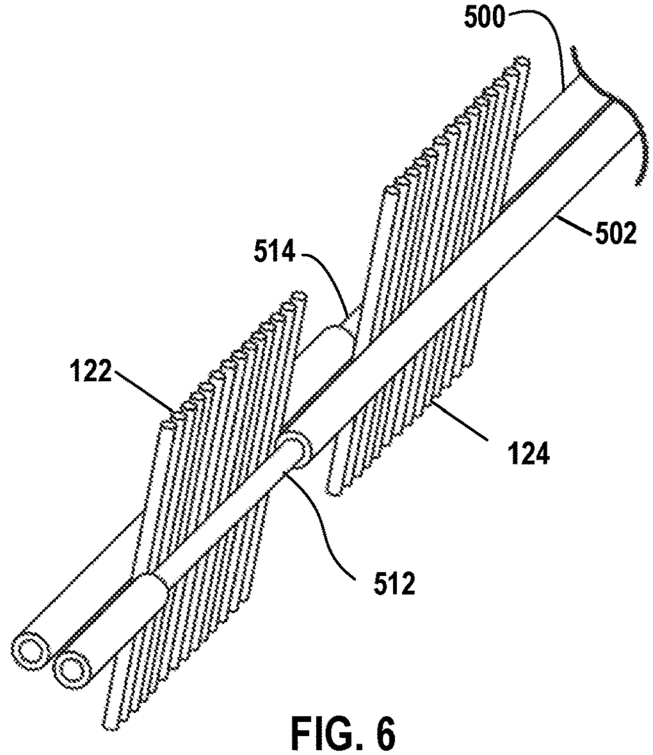
FIG. 6 is a conceptual diagram illustrating example details of the connector tip of the accessory device of FIG. 5 during the intermediate stage of manufacturing the connector tip, in accordance with one or more techniques of this disclosure.

FIG. 5 is a conceptual diagram illustrating an example intermediate stage of manufacturing a connector tip 120 of accessory device 104, in accordance with one or more techniques of this disclosure. FIG. 6 is a conceptual diagram illustrating example details of connector tip 120 of accessory device 104 of FIG. 5 during the intermediate stage of manufacturing the connector tip, in accordance with one or more techniques of this disclosure. As illustrated in the example of FIG. 5, connector tip 120 may include a first wire segment 500 and a second wire segment 502. Wire segment 500 and wire segment 502 are electrically conductive and electrically insulated from each other. For example, each of wire segment 500 and wire segment 502 may have a separate electrically insulating jacket.

Wire segment 500 has a contact surface 504 configured to provide an electrical connection between wire segment 500 and an electrical terminal 506. Wire segment 502 has a contact surface 508 configured to provide an electrical connection between wire segment 502 and an electrical terminal 510. From the perspective of FIG. 5, contact surface 508 is largely hidden. Although illustrated in the example of FIG. 5 as box-shaped structures, the techniques of this disclosure may apply with electrical terminals of various types. For instance, in one example, electrical terminals 506, 510 are terminals of a battery. In some examples, electrical terminals 506, 510 are terminals of wires leading to and from a battery or other electrical components of an accessory device (e.g., accessory device 104). In some examples, electrical terminals 506, 510 are terminals of wires in a cable connected or connectable to an accessory device (e.g., accessory device 104). In some examples, contact surfaces 504, 508 of wire segments 500, 502 are fixedly attached to electrical terminals 506, 510. In other examples, contact surfaces 504, 508 of wire segments 500, 502 are not fixedly attached to electrical terminals 506, 510. In other words, contact surfaces 504, 508 of wire segments 500, 502, may be detached from electrical terminals 506, 510.

As shown in FIG. 5 and FIG. 6, wire segments 500, 502 may be substantially parallel to one another at the intermediate stage of manufacturing connector tip 120. Additionally, each of bristles 122, 124 may be positioned between wire segments 500, 502. Bristles 122, 124 may be arrayed substantially parallel to each other in a direction orthogonal to wire segments 500, 502. Bristles 122 are positioned at a section 512 of wire segment 502 where there is no insulation on wire segment 502 and where there is insulation on wire segment 500. Thus, bristles 122 may be electrically connected to wire segment 502 and electrically insulated from wire segment 500. Bristles 124 are positioned at a section 514 on wire segment 500 where there is no insulation on wire segment 500 and where there is insulation on wire segment 502. Thus, bristles 124 are electrically connected to wire segment 500 and electrically insulated from wire segment 502.

Bristles 122, 124 may be connected to wire segments 500, 502 in one of various ways. For example, connector tip 120 may include an insulated third wire segment (not shown). In this example, bristles 122 may be connected to wire segment 500 by being pinched between the third wire segment and wire segment 502. In this example, bristles 124 may be connected to wire segment 500 by being pinched between the third wire and wire segment 502. In some examples, bristles 122, 124 are soldered (e.g., gang soldered) or welded (e.g., resistance welded) to sections 512, 514 of wire segments 500, 502.

Bristles 122, 124 may be made of a variety of materials. For example, bristles 122, 124 may be made from metal alloys and platings that offer a suitable set of properties for charging and/or data communication applications. In some examples, bristles 122, 124 may be made from a nickel-titanium alloy (e.g., nitinol). These properties may include electrical conductivity, corrosion resistance, elasticity, ductility, fatigue resistance, galvanic potentials close to wire segments 500, 502, and other properties. Example materials may include, but are not limited to, phosphor bronze (copper and tin alloy), brass (copper and zinc alloy), nickel and nickel alloys, gold-played stainless steel, and so on.

In a step of the manufacturing process subsequent to the intermediate step of the manufacturing process shown in FIG. 5 and FIG. 6, wire segments 500, 502 are twisted helically around a common axis. FIG. 7A is a conceptual diagram illustrating example details of connector tip 120 of accessory device 104 of FIG. 4 and FIG. 5 after twisting wire segments 500, 502 of connector tip 120 to spread sets of bristles 122, 124, in accordance with one or more techniques of this disclosure. Thus, in the example of FIG. 7A, wire segment 500 and wire segment 502 are helically twisted around a shared axis 700. Thus, segments 500, 502 form a double helix, wrapping around each other.

Twisting wire segments 500, 502 in this manner may cause bristles 122, 124 to spread out radially from shared axis 700. Thus, bristles 122 may form a first cylindrically shaped array of bristles and bristles 124 may form a second cylindrically shaped array of bristles. Twisting wire segments 500, 502 may also serve to lock bristles 122, 124 in place between wire segments 500, 502.

FIG. 7B is a conceptual diagram illustrating example details of connector tip 120 of the accessory, in which the connector tip includes four sets of bristles, 122, 124, 750, 752, in accordance with one or more techniques of this disclosure. The extra sets of bristles 750, 752 may be attached to two additional wire segments in the same way as shown in the examples of FIG. 5 and FIG. 6. Thus, there initially may be four substantially parallel wire segments. The four wire segments may then be twisted about a single, shared axis. Bristles 122 and bristles 124 may be used for charging hearing instrument 102 while bristles 750 and bristles 752 may be used for data communication, or vice versa. In other words, bristles 122, 124 (or 750, 752) may be configured to carry a first electrical current for charging a rechargeable battery of hearing instrument 102, and bristles 750, 752 (or 122, 124) may be configured to carry a second electrical current that is modulated to communicate of data to or from hearing instrument 102. Such data may include sensor data, processed sound data, or other types of data.

Thus, in the example of FIG. 7B, where wire segment 500, 502 are first and second wire segments, connector tip 120 may further include a third wire segment and a fourth wire segment. The third and fourth wire segments are electrically conductive and electrically insulated from each other. Connector tip 120 may also include a third set of bristles 750 and a fourth set of bristles 752. The third and fourth sets of bristles may be attached to the third wire segment and the fourth wire segment such that the third set of bristles forms a third cylindrically shaped array of bristles and the fourth set of bristles forms a fourth cylindrically shaped array of bristles. The third and fourth sets of bristles 750, 752 are electrically conductive. The third set of bristles 750 is electrically connected to the third wire segment and electrically insulated from the fourth wire segment (as well as the first and second wire segments). The fourth set of bristles 752 is electrically connected to the fourth wire segment and electrically insulated from the third wire segment (as well as the first and second wire segments). The third set of bristles 750 is spaced sufficiently far from the fourth set of bristles 752 as to prevent a short circuit between the third and fourth sets of bristles 750, 752, or the first and second sets of bristles 122, 124.

In other examples, such as the example of FIG. 7A, where connector tip 120 includes two sets of bristles, bristles 122, 124 may be used to carry electrical current for charging a rechargeable battery of hearing instrument 102 and, at other times, carry electrical current that is modulated to communicate data to and/or from hearing instrument 102. In some examples, the electrical current for charging the rechargeable battery of hearing instrument 102 may also be modulated to communicate data to and from hearing instrument 102. In some examples, the electrical current carried by bristles 122, 124 is only used for communication of a modulated electrical current in which data is signaled. Thus, in various examples, wire segments 500, 502, and bristles 122, 124 may carry a modulated electrical current in which data is signaled. For instance, the modulated electrical current may be modulated to communicate data generated by or based on the data generated by one or more sensors (e.g., health-monitoring sensors) in hearing instrument 102 and/or accessory device 104.

FIG. 8 is a conceptual diagram illustrating an example system 800 that includes hearing instrument 102 and an accessory device 802, in accordance with one or more techniques of this disclosure. A tether 804 may connect accessory device 802 and hearing instrument 102. Accessory device 802 may be connected to an end of tether 804 opposite the end having a connector tip, such as connector tip 120, that may be inserted into tunnel 114 of hearing instrument 102. In some examples, tether 804 has two connector tips of a type similar to connector tip 120, one of which may be inserted into hearing instrument 102 and one of which may be inserted into accessory device 802. In the example of FIG. 8, the connector tips are hidden within hearing instrument 102 and accessory device 802. Tether 804 may include two or more wires that connect to the first and second wire segments of the connector tip(s) of tether 804. In some examples, the two or more wires in tether 804 may be integral to the first and second wire segments. In other examples, the two or more wires in tether 804 may be separate wires in electrical connection with the first and second wire segments of the connector tip(s) of tether 804.

Accessory device 802 may be various types of devices. For example, accessory device 802 may be one of various types of devices designed to be worn behind an ear of a user. That is, accessory device 802 may be shaped for wear in an ear of a user. For example, accessory device 802 may comprise a portable battery back-up device, a media playback device, a media streaming device, a behind-the-ear unit of a RIC hearing aid, an external microphone unit, or another type of device. In other examples, accessory device 802 may be device, such as a sensor device, designed to be worn elsewhere on the user's body. For instance, accessory device 802 may be an external microphone device, such as an external microphone device designed to be placed on a table, worn on a lapel, or held in a user's hands. In some examples, accessory device 802 may contain one or more batteries configured to provide electrical energy to hearing instrument 102 via connector tip 120.

In some examples, a user may continue to use hearing instrument 102 while the connector tip 120 is inserted into tunnel 114 and an opposite end of tether 804 is connected to accessory device 802. For example, hearing instrument 102 may continue operating as a hearing aid while connector tip 120 is inserted into tunnel 114. In another example, hearing instrument 102 may continue acting as an earphone while connector tip 120 is inserted into tunnel 114. Thus, in examples where tether 804 is used for recharging a battery of hearing instrument 102, the user may continue using hearing instrument 102 while the battery of hearing instrument 102 is being recharged. This may be an especially useful function when the other end of tether 804 is attached to a portable recharging battery pack. In examples where hearing instrument 102 acts as an earphone, hearing instrument 102 may typically receive streams of media data via a wireless antenna. However, when the battery level of a rechargeable battery of hearing instrument 102 is low or there is excessive radio interference, tether 804 may be used to provide either or both energy for both recharging the battery and media data to hearing instrument 102. For instance, in such an example, hearing instrument 102 may act like a conventional wired earphone. In such examples, accessory device 802 may be a smartphone, tablet computer, portable gaming device, or another type of media device.

In some examples, accessory device 802 comprises a sensor unit. The sensor unit may comprise a device separate from hearing instrument 102. The sensor unit may include one or more sensors, such as sensors for detecting biological information regarding the user of hearing instrument 102. For instance, the sensors may include a heart rate sensor, a blood pressure sensor, a transdermal blood oxygenation sensor, or another type of sensor. In some examples, the sensor unit may be configured to rest in or proximate to the user's ear. For instance, the sensor unit may rest in the concha, tragus, scapha, or other part of the user's ear. The sensor unit may use tether 804 to communicate data to hearing instrument 102. Hearing instrument 102 may store the data from the sensor unit in a memory. In some examples, hearing instrument 102 may send data from the sensor unit to another device (e.g., a smartphone, personal computer, etc.) wirelessly or via another cable insertable into tunnel 114. In some examples, one or more processors in hearing instrument 102 may process the sensor data and output audible sound based on the sensor data. For instance, hearing instrument 102 may alert the user to slow their heart rate.

In some examples, hearing instrument 102 comprises a sensor unit that includes any of the types of sensors mentioned above, or others. In such examples, hearing instrument 102 may transmit data generated by or based on the sensors to accessory device 802 via tether 804.

In some examples, accessory device 802 may include one or more speakers that generate sound. Tether 804 may include a sound tube in addition to or as an alternative to the two or more wires in tether 804. The sound tube may be attached to accessory device 802 using a self-scaling acoustic port. The sound tube may guide the sound generated by the one or more speakers of accessory device 802 into tunnel 114 of hearing instrument 102. Tunnel 114 may then guide the sound into an ear canal of a user of hearing instrument 102. Because bristles 122, 124 do not form a solid mass, the sound may pass between bristles 122, 124 without significant attenuation.

In examples where tether 804 includes a sound tube, the speakers in accessory device 802 may be specialized speakers that supplement or serve in place of speakers in hearing instrument 102. For example, the speakers in accessory device 802 may include woofers and/or tweeters that are designed to better produce sounds having low- and high-frequencies, respectively. The frequencies produced by the extra speakers in accessory device 802 may augment sound produced by speakers in hearing instrument 102 and improve the listening experience for the user of hearing instrument 102. Thus, in this example, a user may want to use accessory device 802 when the user plans to listen to music, watch a movie, or enjoy other types of audio content.

In some examples where accessory device 802 includes one or more speakers and tether 804 includes a sound tube, hearing instrument 102 does not include a receiver (i.e., a device that includes one or more speakers) for generating sounds typically to be heard by the user. Instead, the speakers in accessory device 802 may generate the sounds typically to be heard by the user. Thus, with respect to generation of sound, accessory device 802 may function in the manner of a BTE hearing instrument. However, in such examples, hearing instrument 102 may include one or more sensors, such as any of the types of sensors discussed elsewhere in this disclosure. Hearing instrument 102 may transmit data generated by or based on the sensors to accessory device 802. In some such examples, tether 804 is detachable from accessory device 802 and a user may remove tether 804 and use a conventional sound tube with accessory device 802.

FIG. 9 is a conceptual diagram illustrating an example accessory device 900 in accordance with one or more techniques of this disclosure. In the example of FIG. 9, accessory device 900 includes two connector tips 902A, 902B (collectively, "connector tips 902"). Each of connector tips 902 may be of the type described elsewhere in this disclosure with respect to connector tip 120.

A body member 906 of accessory device 900 may contain one or more batteries that are configured to provide electrical energy to a first hearing instrument via connector tip 902 and a second hearing instrument via connector tip 904. In this way, a user may use accessory device 900 as a portable charging device for hearing instruments. Accessory device 900 may include a port 908 into which a charging cable may be inserted for recharging the batteries of accessory device 900.

In some examples, connector tips 902 may each be removable from body member 906 of accessory device 900. Thus, a user may replace connector tips 902 when connector tips 902 become worn.

FIG. 10 is a conceptual diagram illustrating an example charging case accessory device 1000 in accordance with one or more techniques of this disclosure. Charging case accessory device 1000 may be designed for charging rechargeable batteries of hearing instruments. For instance, charging case accessory device 1000 may be placed on a nightstand of a user of the hearing instruments. Charging case accessory device 1000 may include a charging cord 1002 that is configured to connect to an external power source, such as an electrical outlet or a Universal Serial Bus (USB) port.

As shown in the example of FIG. 10, charging case accessory device 1000 may include connector tips 1004A, 1004B (collectively, "connector tips 1004"). In other examples, charging case accessory device 1000 may include a single connector tip or more than two connector tips. Each of connector tips 902 may be of the type described elsewhere in this disclosure with respect to connector tip 120. A user may recharge batteries of hearing instruments by placing the hearing instruments into charging case accessory device 1000 in such a way that connector tips 1004 are inserted into tunnels of the hearing instruments. Thus, in some examples, charging case accessory device 1000 may comprise electrical components for providing electrical energy from a power grid to a hearing instrument via a connector tip (e.g., connector tip 1004A, 1004B).

Thus, in at least the examples of FIG. 9 and FIG. 10, an accessory device may include a first connector tip and a second connector tip. The first connector tip comprises a first wire segment and a second wire segment. The first and second wire segments are electrically conductive and electrically insulated from each other, the first wire segment has a first contact surface configured to provide a first electrical connection between the first wire segment and a first electrical terminal, and the second wire segment has a second contact surface configured to provide a second electrical connection between the second wire segment and a second electrical terminal. The first connector tip also includes a first set of bristles and a second set of bristles. The first and second sets of bristles are electrically conductive, the first set of bristles is electrically connected to the first wire segment and electrically insulated from the second wire segment, the second set of bristles is electrically connected to the second wire segment and electrically insulated from the first wire segment, and the first set of bristles is spaced sufficiently far from the second set of bristles as to prevent a short circuit between the first and second sets of bristles. The second connector tip comprises a third wire segment and a fourth wire segment. The third and fourth wire segments are electrically conductive and electrically insulated from each other. The second connector tip also includes a third set of bristles and a fourth set of bristles. The third and fourth sets of bristles are electrically conductive, the third set of bristles is electrically connected to the third wire segment and electrically insulated from the fourth wire segment, the fourth set of bristles is electrically connected to the fourth wire segment and electrically insulated from the third wire segment, and the third set of bristles is spaced sufficiently far from the fourth set of bristles as to prevent a short circuit between the third and fourth sets of bristles.

One design consideration in designing any electrical system that involves making a connection between two sets of electrical terminals is how to ensure that the correct polarity is achieved. For example, electrical components of hearing instrument 102 may be damaged if a negative terminal (e.g., contact pad 202) is electrically connected to a positive terminal of connector tip 120 (e.g., bristles 124) or a positive terminal (e.g., contact pad 204) is electrically connected to a negative terminal of connector tip 120 (e.g., bristles 122). Because tunnel 114 has both a lateral portal 116 and medial portal 118, a user may potentially insert connector tip 120 into either lateral portal 116 or medial portal 118. If not accounted for, this may lead to a polarity mismatch problem.

Accordingly, in some examples, connector tip 120 may be keyed so that the correct sets of bristles 122, 124 connect to the correct contact pads 202, 204. For example, tunnel 114 and/or connector tip 120 may include one or more components that prevent connector tip 120 from being inserted into whichever of lateral portal 116 or medial portal 118 would result in incorrect polarity matching. For example, medial portal 118 may have a narrower diameter than lateral portal 116. In this example, a component (e.g., a ball-shaped electrical insulator) positioned at a distal end of connector tip 120 (e.g., an end opposite handle 126) may have a diameter smaller than the diameter of lateral portal 116 but larger than the diameter of medial portal 118. In another example, there may be a disc-shaped member positioned between bristles 122, 124 which may engage a structure protruding from tunnel wall 112 at a point that prevents connector tip 120 from being inserted into tunnel 114 in a way that would result in a polarity mismatch.

In some examples, a full-bridge rectifier, which may also be referred to as an either-way-OK (EWOK) circuit, may be included in hearing instrument 102, accessory device 104, or another device. The full-bridge rectifier may be configured to switch which of bristles 122, 124 corresponds to a positive terminal of a circuit and which of bristles 122, 124 corresponds to a negative terminal of the circuit.

FIG. 11 is a circuit diagram illustrating an example full-bridge rectifier 1100 for use in hearing instrument 102, in accordance with one or more techniques of this disclosure. In the example of FIG. 11, contact pads 1102A, 1102B (collectively, "charging contacts 1102") may correspond to contact pads 202, 204 (FIG. 2), respectively. In examples where contact pads 1102 are included in a circuit to recharge a battery of hearing instrument 102, contact pads 1102 may be charging contacts. The "+/−" and "−/+" symbols indicate that polarity is uncertain for contact pads 1102. Output 1104A of full-bridge rectifier 1100 may always have positive polarity and output 1104B of full-bridge rectifier 1100 may always have negative polarity. Outputs 1104A, 1104B may lead to one or more electrical components of hearing instrument 102, such as a rechargeable battery of hearing instrument 102, a processing circuit of hearing instrument 102, or other components of hearing instrument 102. In this disclosure, the triangle-bar symbols indicate diodes. Including full-bridge rectifier 1100 in hearing instrument 102 may add size and complexity to hearing instrument 102, which may be undesirable in some scenarios.

FIG. 12 is a circuit diagram illustrating an example full-bridge rectifier 1200 for use in accessory device 104, in accordance with one or more techniques of this disclosure. In some examples, full-bridge rectifier 1200 is included in handle 126 (FIG. 1). In the example of FIG. 12, contact surfaces 1202A, 1202B (collectively, "contact surfaces 1202") may provide electrical connections to first and second electrical terminals, such as terminals of a battery, terminals of other wires, and so on. Output 1204A of full-bridge rectifier 1200 may always have positive polarity and output 1204B of full-bridge rectifier 1200 may always have negative polarity. Outputs 1204A, 1204B may correspond to wire segments 500, 502 (FIG. 5). Including full-bridge rectifier 1100 in accessory device 104 may add size and complexity to accessory device 104, which may be undesirable in some scenarios, such as scenarios where accessory device 104 is a disposable handle.

FIG. 13 is a circuit diagram illustrating an example circuit 1300 for sensing and switching polarity in a charger device, in accordance with one or more techniques of this disclosure. In this disclosure, triangle-circle symbols indicate inverters, and zigzag symbols indicate resistors. PMOS indicates a p-channel metal-oxide-semiconductor field-effect transistor (MOSFET). NMOS indicates a n-channel MOSFET.

Various types of charger devices may include circuit 1300. For example, charging case accessory device 1000 (FIG. 10) or another type of device may include circuit 1300. The charger device may determine connection polarity in a number of ways and supply either polarity to contact pads 202, 204 of hearing instrument 102 and sense which polarity is correct for hearing instrument 102.

In the example of FIG. 13, the charger device may control a polarity selection signal 1304 that controls PMOS 1306, NMOS 1308, PMOS 1310, and NMOS 1312. PMOS 1306, NMOS 1308, PMOS 1310, and NMOS 1312 are Complementary Metal-Oxide-Semiconductor (CMOS) switches that supply contact surfaces 1302A, 1302B (collectively, "contact surfaces 1302"). By controlling polarity selection signal 1304 and sensing current draw (which may vary depending on the polarity of how hearing instrument 102 is attached), the charger device may control the polarity of the current flowing through contact surfaces 1302.

This methodology could put large reverse currents through the rechargable device when the polarity is incorrect and hearing instrument 102 does not have sufficient reverse polarity protection. Accordingly, in some examples, contact surfaces 1302 could power the contacts through a high impedance source so as to reduce the maximum possible reverse current when the polarity is incorrect. Once the polarity is determined, the charging device may switch to a high-power, low-impedance charging source.

FIG. 14 is a flowchart illustrating an example operation for assembling a connector tip for an accessory device for a hearing instrument, in accordance with one or more techniques of this disclosure. FIG. 14 is provided as an example. In other examples, operations may include more or fewer actions, or actions may be performed in different orders.

In the example of FIG. 14, an assembler may attach a first set of bristles 122 to an electrically uninsulated portion of a first wire segment 502 (1400). The first set of bristles 122 and the first wire segment 502 are electrically conductive. Additionally, the assembler may attach a second set of bristles 124 to an electrically uninsulated portion of a second wire segment 500 (1402). The second set of bristles 124 and the second wire segment 500 are electrically conductive.

The assembler may position the first and second wire segments 502, 500 substantially parallel to one another such that the first and second wire segments 502, 500 are in contact with each other, but no uninsulated portion of the first wire segment 502 is in contact with the uninsulated portion of the second wire segment 500 and no uninsulated portion of the second wire segment is in contact with the uninsulated portion of the first wire segment (1404). Thus, connector tip 120 may attain the state shown in FIG. 5.

Subsequently, the assembler may twist the first and second wire segments 502, 500 around a shared axis such that the first and second sets of bristles 122, 124 spread out radially from the shared axis and the first and second wire segments 502, 500 form a double helix around the shared axis (1406). Thus, connector tip 120 may attain the state shown in FIG. 7A or FIG. 7B. After twisting the first and second wire segments 502, 500, the first set of bristles 122 is spaced sufficiently far from the second set of bristles 124 as to prevent a short circuit between the first and second sets of bristles 122, 124 due to bending of a bristle of the first or second sets of bristles 122, 124.

Furthermore, in some examples, radii of the first and second sets of bristles 122, 124 are longer than a radius of a tunnel 114 defined by a shell 106 of hearing instrument 102 and short enough for connector tip 120 to be inserted into tunnel 114 while bending the first and second sets of bristles 122, 124. In some examples, after twisting the first and second wire segments 502, 500, the assembler may form (e.g., mold, shape, etc.) a handle 126 over one end of connector tip 120.

FIG. 15 is a conceptual diagram illustrating an example accessory device 1500 in accordance with one or more techniques of this disclosure. In the example of FIG. 15, accessory device 1500 includes a connector tip 1502 having bristles 1504. Unlike connector tip 120, e.g. as shown in FIGS. 1, 2, and 7A, connector tip 1502 includes a single set of bristles 1504. In the example of FIG. 15, bristles 1504 are arranged as a helix. However, in other examples, bristles 1504 may be arranged in different patterns. Similar to the role of bristles 122 or bristles 124, bristles 1504 may be inserted into a portal (e.g., lateral portal 116) of tunnel 114 of hearing instrument 102. When inserted into the portal, bristles 124 may form an electrical contact with a contact pad that is electrically connected to one or more electrical components 216 of hearing instrument 102.

In the example of FIG. 15, connector tip 1502 includes a contact element 1506. When connector tip 1502 is inserted into tunnel 114 of hearing instrument 102, contact element 1506 of connector tip 1502 touches a contact element of hearing instrument 102 located e.g., at a portal (e.g., lateral portal 116) of tunnel 114. In some examples, the contact element of hearing instrument 102 is embedded in a faceplate of hearing instrument 102. The contact element of hearing instrument 102 is electrically connected to one or more electrical components 216 of hearing instrument 102. Thus, when connector tip 1502 is inserted into tunnel 114, bristles 1504 and contact element 1506 of connector tip 1502 may connect accessory device 1500 to hearing instrument 102, e.g., for recharging a battery of hearing instrument 102, providing communication between hearing instrument 102 and device 1500, between hearing instrument 102 and other devices, or other functions. In some examples, contact element 1506 of connector tip 1502 has a cylindrical shape, a torus shape, a cubic shape, or another type of shape.

Bristles 1504 and contact element 1506 of connector tip 1502 may be configured to serve as different terminals of an electrical circuit. In some examples, bristles 1504 may be configured to serve as a negative terminal and contact element 1506 of connector tip 1502 may be configured to serve as a positive terminal. In some examples, bristles 1504 may be configured to serve as a positive terminal and contact element 1506 of connector tip 1502 may be configured to serve as a negative terminal. In some examples, enhanced electrostatic discharge protection occurs when bristles 1504 serve as the positive terminal and contact element 1506 of connector tip 1502 serves as the negative terminal. Because a user of hearing instrument 102 may touch bristles 1504 and contact element 1506 of connector tip 1502, accessory device 1500 may include circuitry to protect the user from current leakage.

FIG. 16 is a cross-section view of an example base portion of connector tip 1502 in accordance with one or more techniques of this disclosure. In the example of FIG. 16, contact element 1506 of connector tip 1502 has a cylindrical shape. Furthermore, FIG. 16 shows a bushing 1600 and a portion of a shell 1602 of hearing instrument 102. Thus, in the example of FIG. 16, connector tip 1502 is inserted into tunnel 114 of hearing instrument 102. Furthermore, bushing 1600 defines a notch 1604. A contact pin 1606 is positioned in notch 1604 to touch contact element 1506 of connector tip 1502 when connector tip 1502 is inserted through the opening defined by bushing 1600.

In the example of FIG. 16, contact element 1506 defines an annular groove 1608. When connector tip 1502 is not inserted through the opening defined by bushing 1600, contact pin 1606 may be in a relaxed state. In the relaxed state of contact pin 1606, a portion of contact pin 1606 may form a chord within the opening defined by bushing 1600. As connector tip 1502 is inserted through the opening defined by bushing 1600 and into tunnel 114 of hearing instrument 102, contact pin 1606 may deflect outwardly from a center of the opening. When connector tip 1502 is sufficiently inserted, contact pin 1606 may at least partially return to its relaxed state and fit into annular groove 1608. In this way, contact pin 1606 may help to retain connector tip 1502 in tunnel 114 and may provide a stable electrical connection between contact pin 1606 and contact element 1506.

FIG. 17 is a cutaway view of an example portion of hearing instrument 102 configured for engagement with connector tip 1502 of FIG. 16. In the example of FIG. 17, shell 1602 of hearing instrument 102 defines a portal 1700. Portal 1700 may be lateral portal 116 (FIG. 1) or medial portal 118 (FIG. 1). Bushing 1600 is positioned at a margin of portal 1700. Bushing 1600 defines notch 1604 through which contact pin 1606 emerges. Contact pin 1606 may be electrically connected to electrical components 216 (FIG. 2) of hearing instrument 102. When connector tip 1502 is inserted into portal 1700, bristles 1504 pass through portal 1702. When connector tip 1502 is fully inserted through portal 1702, contact pin 1606 may touch contact element 1506 of connector tip 1502. FIG. 18 is a perspective view of an example bushing 1600 in accordance with one or more techniques of this disclosure.

Thus, in the examples of FIG. 16-18, hearing instrument 102 may comprise a shell 106 (a portion of which is shown in FIG. 16 and FIG. 17 and shell 1602). Electrical components 216 are encased within shell 106. Hearing instrument 102 further comprises a contact pad that is electrically connected to electrical components 216. The contact pad may be configured in a manner similar to either of contact pads 202 or 204. A tunnel wall is shaped to define a tunnel 114 that passes through the in-ear hearing instrument from a lateral surface of shell 106 to a medial surface of shell 106 and is open at both the lateral surface 108 of shell 106 and medial surface 110 of shell 106. The shell 106 includes a tunnel wall that defines a contact pad aperture through which a distal end of the contact pad passes. The distal end of the contact pad is positioned to make electrical contact with a set of bristles 1504 of connector tip 1502 when connector tip 1502 is removably inserted into the tunnel 114. Hearing instrument 102 further includes a contact pin 1606 positioned at a portal of tunnel 114. Contact pin 1606 is electrically connected to electrical components 216 and contact pin 1606 is positioned to make electrical contact with a contact element 1506 of connector tip 1502 when connector tip 1502 is removably inserted into tunnel 114.

The following is a non-limiting list of examples that are in accordance with one or more techniques of this disclosure.

Example 1. An accessory device for a hearing instrument, the accessory device comprising: a connector tip that comprises: a first wire segment and a second wire segment, wherein: the first and second wire segments are electrically conductive and electrically insulated from each other, the first wire segment has a first contact surface configured to provide a first electrical connection between the first wire segment and a first electrical terminal, and the second wire segment has a second contact surface configured to provide a second electrical connection between the second wire segment and a second electrical terminal; and a first set of bristles and a second set of bristles, wherein: the first and second sets of bristles are electrically conductive, the first set of bristles is electrically connected to the first wire segment and electrically insulated from the second wire segment, the second set of bristles is electrically connected to the second wire segment and electrically insulated from the first wire segment, and the first set of bristles is spaced from the second set of bristles as to prevent a short circuit between the first and second sets of bristles due to bending of a bristle of the first or second sets of bristles.

Example 2. The accessory device of example 1, further comprising a handle from which the connector tip protrudes.

Example 3. The accessory device of example 2, wherein the connector tip is detachable from the handle.

Example 4. The accessory device of any of examples 1-3, wherein the first and second wire segments and first and second sets of bristles are configured to carry an electrical current that charges a rechargeable battery of the hearing instrument.

Example 5. The accessory device of any of examples 1-4, wherein the first and second wire segments and first and second sets of bristles are configured to carry a modulated electrical current in which data is signaled.

Example 6. The accessory device of example 5, wherein the modulated electrical current is modulated to communicate data generated by or based on the data generated by one or more sensors in at least one of the hearing instrument or the accessory device.

Example 7. The accessory device of any of examples 1-6, further comprising a full-bridge rectifier, the full-bridge rectifier configured to switch which of the first and second sets of bristles corresponds to a positive terminal of a circuit and which of the first and second sets of bristles corresponds to a negative terminal of the circuit.

Example 8. The accessory device of any of examples 1-7, wherein: the connector tip is bendable under force sufficient to insert the connector tip into a curved tunnel of the hearing instrument, and the connector tip returns at least partially to an original shape upon removal of the connector tip from the curved tunnel of the hearing instrument.

Example 9. The accessory device of example 8, wherein a springback force of the connector tip is sufficient to assist with preventing the connector tip from passively falling out of the curved tunnel of the hearing instrument.

Example 10. The accessory device of any of examples 1-9, wherein the connector tip further comprises: a third wire segment and a fourth wire segment, wherein the third and fourth wire segments are electrically conductive and electrically insulated from each other; a third set of bristles and a fourth set of bristles, wherein: the third and fourth sets of bristles are electrically conductive, the third set of bristles is electrically connected to the third wire segment and electrically insulated from the fourth wire segment, the fourth set of bristles is electrically connected to the fourth wire segment and electrically insulated from the third wire segment, and the third set of bristles is spaced sufficiently far from the fourth set of bristles as to prevent a short circuit between the third and fourth sets of bristles.

Example 11 The accessory device of example 10, wherein: the first and second sets of bristles are configured to carry a first electrical current for charging a rechargeable battery of the hearing instrument, and the third and fourth sets of bristles are configured to carry a second electrical current that is modulated to communicate of data to or from the hearing instrument.

Example 12. The accessory device of any of examples 1-11, wherein: the first and second sets of bristles are configured to carry a first electrical current for charging a rechargeable battery of the hearing instrument, and the first and second sets of bristles are configured to carry, at a different time, a second electrical current that is modulated to communicate of data to or from the hearing instrument.

Example 13. The accessory device of any of examples 1-12, further comprising a stop member at a distance from a distal tip of the connector tip appropriate for stopping over-insertion of the connector tip into a tunnel of a hearing instrument, wherein over-insertion occurs when the first and second sets of bristles move sufficiently far past a first contact pad and a second contact pad of the hearing instrument as to prevent reliable electrical contact between the first set of bristles and the first contact pad and to prevent reliable electrical contact between the second set of bristles and the second contact pad.

Example 14. The accessory device of example 13, further comprising a handle from which the connector tip protrudes, wherein the stop member forms part of the handle.

Example 15. The accessory device of any of examples 1-14, wherein the first wire segment and the second wire segment are helically twisted around a shared axis.

Example 16. The accessory device of any of examples 1-15, further comprising a body member that comprises one or more batteries configured to provide electrical energy to the hearing instrument via the connector tip.

Example 17. The accessory device of example 16, wherein the body member contains the one or more batteries and is shaped for wear behind an ear of a user.

Example 18. The accessory device of any of examples 1-17, wherein the accessory device comprises a charging case that comprises electrical components for providing electrical energy from a power grid to a hearing instrument via the connector tip.

Example 19. The accessory device of any of examples 1-18, wherein the connector tip is a first connector tip, and the accessory device further comprises: a second connector tip that comprises: a third wire segment and a fourth wire segment, wherein the third and fourth wire segments are electrically conductive and electrically insulated from each other; a third set of bristles and a fourth set of bristles, wherein: the third and fourth sets of bristles are electrically conductive, the third set of bristles is electrically connected to the third wire segment and electrically insulated from the fourth wire segment, the fourth set of bristles is electrically connected to the fourth wire segment and electrically insulated from the third wire segment, and the third set of bristles is spaced from the fourth set of bristles as to prevent a short circuit between the third and fourth sets of bristles.

Example 20. The accessory device of example 19, further comprising a body member that comprises one or more batteries configured to provide electrical energy to a first hearing instrument via the first connector tip and to a second hearing instrument via the second connector tip.

Example 21. The accessory device of any of examples 1-20, wherein the first and second sets of bristles have sufficient rigidity to brush ear-generated materials from a first and a second electrical contact pad of the hearing instrument.

Example 22. The accessory device of any of examples 1-21, wherein: a tunnel wall of the hearing instrument defines the tunnel, the tunnel wall is shaped such that the tunnel wall defines one or more contact pad apertures through which distal ends of a first contact pad of the hearing instrument and a second contact pad of the hearing instrument pass, electrical contact is made between the first set of bristles and the first contact pad and electrical contact is made between the second set of bristles and the second contact pad when the connector tip is inserted into the tunnel, the first set of bristles has sufficient rigidity such that when the connector tip is inserted into a first portal of a tunnel of the hearing instrument, the first set of bristles are able to push car-generated materials out a second portal of the tunnel.

Example 23. The accessory device of any of examples 1-22, wherein the first and second sets of bristles are attached to the first wire segment and the second wire segment such that the first set of bristles forms a first cylindrically shaped array of bristles and the second set of bristles forms a second cylindrically shaped array of bristles.

Example 24. The accessory device of any of examples 1-23, wherein the accessory device further comprises: one or more speakers; and a tether that connects the accessory device to the hearing instrument, wherein the tether comprises: wires that connect to the first and second wire segments of the connector tip; and a sound tube configured to guide sound generated by the one or more speakers into a tunnel defined by a tunnel wall of a shell of the hearing instrument.

Example 25. A method comprising assembling a connector tip for an accessory device for a hearing instrument, wherein assembling the connector tip comprises: attaching a first set of bristles to an electrically uninsulated portion of a first wire segment, wherein the first set of bristles and the first wire segment are electrically conductive; attaching a second set of bristles to an electrically uninsulated portion of a second wire segment, wherein the second set of bristles and the second wire segment are electrically conductive; positioning the first and second wire segments substantially parallel to one another such that the first and second wire segments are in contact with each other, but no uninsulated portion of the first wire segment is in contact with the uninsulated portion of the second wire segment and no uninsulated portion of the second wire segment is in contact with the uninsulated portion of the first wire segment; and twisting the first and second wire segments around a shared axis such that the first and second sets of bristles spread out radially from the shared axis and the first and second wire segments form a double helix around the shared axis, wherein: after twisting the first and second wire segments, the first set of bristles is spaced from the second set of bristles as to prevent a short circuit between the first and second sets of bristles due to bending of a bristle of the first or second sets of bristles.

Example 26. The method of example 25, wherein radii of the first and second sets of bristles are longer than a radius of a tunnel defined by a shell of the hearing instrument and short enough for the connector tip to be inserted into the tunnel while bending the first and second sets of bristles.

Example 27. The method of any of examples 25-26, further comprising, after twisting the first and second wire segments, molding a handle over one end of the connector tip.

Example 28. An accessory device for a hearing instrument, the accessory device comprising: a connector tip configured for insertion into a tunnel defined by a shell of a hearing instrument, the connector tip comprising: a contact element that is electrically conductive; and a set of bristles that are electrically conductive, wherein the set of bristles are distal on the connector tip relative to the contact element.

Example 29. The accessory device of example 28, further comprising a handle from which the connector tip protrudes.

Example 30. The accessory device of any of examples 28-29, wherein the contact element is shaped to define an annular groove that accepts a contact pin of the hearing instrument when the connector tip is inserted into the tunnel defined by the shell of the hearing instrument.

Example 31. The accessory device of any of examples 28-30, wherein the set of bristles and the contact element are configured to carry an electrical current that charges a rechargeable battery of the hearing instrument.

Example 32. The accessory device of any of examples 28-31, wherein the set of bristles and the contact element are configured to carry an electrical current that is modulated to communicate data.

Example 33. The accessory device of any of examples 28-32, wherein the set of bristles is configured to serve as a positive terminal of a circuit and the contact element is configured to serve as a negative terminal of the circuit.

Example 34. An in-ear hearing instrument comprising: a shell; electrical components encased within the shell; a contact pad that is electrically connected to the electrical components, wherein the shell includes a tunnel wall that is shaped to define a tunnel that passes through the in-ear hearing instrument from a lateral surface of the shell to a medial surface of the shell and is open at both the lateral surface of the shell and the medial surface of the shell, wherein: the tunnel wall defines a contact pad aperture through which a distal end of the contact pad passes, the distal end of the contact pad is positioned to make electrical contact with a set of bristles of a connector tip when the connector tip is removably inserted into the tunnel; and a contact pin positioned at a portal of the tunnel, wherein the contact pin is electrically connected to the electrical components and the contact pin is positioned to make electrical contact with a contact element of the connector tip when the connector tip is removably inserted into the tunnel.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently. e.g., through multi-threaded processing, interrupt processing, or multiple processors, rather than sequentially.

Various examples have been described. These and other examples are within the scope of the following claims.

What is claimed is:

1. An accessory device for a hearing instrument, the accessory device comprising:

a connector tip that comprises:

a first wire segment and a second wire segment, wherein:

the first and second wire segments are electrically conductive and electrically insulated from each other, the first wire segment has a first contact surface configured to provide a first electrical connection between the first wire segment and a first electrical terminal, and the second wire segment has a second contact surface configured to provide a second electrical connection between the second wire segment and a second electrical terminal; and a first set of bristles and a second set of bristles, wherein:

the first and second sets of bristles are electrically conductive, the first set of bristles is electrically connected to the first wire segment and electrically insulated from the second wire segment, the second set of bristles is electrically connected to the second wire segment and electrically insulated from the first wire segment, and the first set of bristles is spaced from the second set of bristles as to prevent a short circuit between the first and second sets of bristles due to bending of a bristle of the first or second sets of bristles.

2. The accessory device of claim 1, wherein at least one of:

the first and second wire segments and first and second sets of bristles are configured to carry an electrical current that charges a rechargeable battery of the hearing instrument, or the first and second wire segments and first and second sets of bristles are configured to carry an electrical current that is modulated to communicate data.

3. The accessory device of claim 1, wherein:

at least a portion of the connector tip is bendable under force sufficient to insert the connector tip into a curved tunnel of the hearing instrument, and the portion of the connector tip is configured to return at least partially to an original shape from a bent shape upon removal of the connector tip from the curved tunnel of the hearing instrument.

4. The accessory device of claim 3, wherein a springback force of the connector tip is sufficient to assist with preventing the connector tip from passively falling out of the curved tunnel of the hearing instrument.

5. The accessory device of claim 1, wherein the connector tip further comprises:

a third wire segment and a fourth wire segment, wherein the third and fourth wire segments are electrically conductive and electrically insulated from each other;

a third set of bristles and a fourth set of bristles, wherein:

the third and fourth sets of bristles are electrically conductive, the third set of bristles is electrically connected to the third wire segment and electrically insulated from the fourth wire segment, the fourth set of bristles is electrically connected to the fourth wire segment and electrically insulated from the third wire segment, and the third set of bristles is spaced sufficiently far from the fourth set of bristles as to prevent a short circuit between the third and fourth sets of bristles.

6. The accessory device of claim 5, wherein the first and second sets of bristles are configured to carry a first electrical current for charging a rechargeable battery of the hearing instrument, and the third and fourth sets of bristles are configured to carry a second electrical current that is modulated to communicate data to or from the hearing instrument.

7. The accessory device of claim 1, wherein at least one of:

the first and second sets of bristles are configured to carry a first electrical current for charging a rechargeable battery of the hearing instrument, and the first and second sets of bristles are configured to carry, at a different time, a second electrical current that is modulated to communicate first data to or from the hearing instrument, or the first and second sets of bristles are configured to carry a third electrical current for charging the rechargeable battery of the hearing instrument that is modulated to communicate second data to or from the hearing instrument.

8. The accessory device of claim 1, further comprising a stop member at a distance from a distal tip of the connector tip appropriate for stopping over-insertion of the connector tip into a tunnel of a hearing instrument, wherein over-insertion occurs when the first and second sets of bristles move sufficiently far past a first contact pad and a second contact pad of the hearing instrument so as to prevent reliable electrical contact between the first set of bristles and the first contact pad and to prevent reliable electrical contact between the second set of bristles and the second contact pad.

9. The accessory device of claim 1, wherein the first wire segment and the second wire segment are helically twisted around a shared axis.

10. The accessory device of claim 1, wherein the first and second sets of bristles have sufficient rigidity to brush ear-generated materials from a first electrical contact pad and a second electrical contact pad of the hearing instrument.

11. The accessory device of claim 1, wherein:

a tunnel wall of the hearing instrument defines a tunnel, the tunnel wall is shaped such that the tunnel wall defines one or more electrical contact pad apertures through which distal ends of a first contact pad of the hearing instrument and a second contact pad of the hearing instrument pass, the electrical contact pad apertures are configured such that electrical contact is made between the first set of bristles and the first contact pad and electrical contact is made between the second set of bristles and the second contact pad when the connector tip is inserted into the tunnel, and the first set of bristles has sufficient rigidity such that when the connector tip is inserted into a first portal of a tunnel of the hearing instrument, the first set of bristles are able to push ear-generated materials out a second portal of the tunnel.

12. The accessory device of claim 1, wherein the accessory device further comprises:

one or more speakers; and a tether that connects the accessory device to the hearing instrument, wherein the tether comprises:

wires that connect to the first and second wire segments of the connector tip; and a sound tube configured to guide sound generated by the one or more speakers into a tunnel defined by a tunnel wall of a shell of the hearing instrument.

13. A method comprising assembling a connector tip for an accessory device for a hearing instrument, wherein assembling the connector tip comprises:

attaching a first set of bristles to an electrically uninsulated portion of a first wire segment, wherein the first set of bristles and the first wire segment are electrically conductive;

attaching a second set of bristles to an electrically uninsulated portion of a second wire segment, wherein the second set of bristles and the second wire segment are electrically conductive;

positioning the first and second wire segments substantially parallel to one another such that the first and second wire segments are in contact with each other, but no uninsulated portion of the first wire segment is in contact with the uninsulated portion of the second wire segment and no uninsulated portion of the second wire segment is in contact with the uninsulated portion of the first wire segment; and twisting the first and second wire segments around a shared axis such that the first and second sets of bristles spread out radially from the shared axis and the first and second wire segments form a double helix around the shared axis, wherein:

after twisting the first and second wire segments, the first set of bristles is spaced from the second set of bristles so as to prevent a short circuit between the first and second sets of bristles due to bending of a bristle of the first or second sets of bristles.

14. The method of claim 13, wherein radii of the first and second sets of bristles are longer than a radius of a tunnel defined by a shell of the hearing instrument and short enough for the connector tip to be inserted into the tunnel while bending the first and second sets of bristles.

15. The method of claim 13, further comprising, after twisting the first and second wire segments, forming a handle over one end of the connector tip.

* * * * *